United States Patent
Uy et al.

(10) Patent No.: US 11,297,037 B2
(45) Date of Patent: Apr. 5, 2022

(54) METHOD AND NETWORK DEVICE FOR OVERLAY TUNNEL TERMINATION AND MIRRORING SPANNING DATACENTERS

(71) Applicant: Arista Networks, Inc., Santa Clara, CA (US)

(72) Inventors: Alexander Uy, Seattle, WA (US); Stefan Kheraj, Burnaby (CA)

(73) Assignee: Arista Networks, Inc., Santa Clara, CA (US)

( * ) Notice: Subject to any disclaimer, the term of this patent is extended or adjusted under 35 U.S.C. 154(b) by 191 days.

(21) Appl. No.: 16/517,968

(22) Filed: Jul. 22, 2019

(65) Prior Publication Data
US 2021/0029087 A1    Jan. 28, 2021

(51) Int. Cl.
*H04L 29/06* (2006.01)
*H04L 12/46* (2006.01)
*H04L 43/062* (2022.01)
*H04L 101/622* (2022.01)
*H04L 69/22* (2022.01)

(52) U.S. Cl.
CPC ...... *H04L 63/0272* (2013.01); *H04L 12/4633* (2013.01); *H04L 12/4641* (2013.01); *H04L 43/062* (2013.01); *H04L 61/6022* (2013.01); *H04L 69/22* (2013.01)

(58) Field of Classification Search
CPC ............. H04L 63/0272; H04L 12/4633; H04L 12/4641; H04L 43/062; H04L 61/6022; H04L 69/22
See application file for complete search history.

(56) References Cited

U.S. PATENT DOCUMENTS

| | | | | |
|---|---|---|---|---|
| 7,899,048 | B1 * | 3/2011 | Walker | H04L 43/18 370/390 |
| 8,520,540 | B1 * | 8/2013 | Foschiano | H04L 43/0852 370/252 |
| 10,326,830 | B1 * | 6/2019 | Singh | H04L 67/1004 |
| 11,119,804 | B2 * | 9/2021 | Gokhale | H04L 12/4633 |
| 2005/0278565 | A1 | 12/2005 | Frattura et al. | |
| 2007/0121486 | A1 * | 5/2007 | Guichard | H04L 45/22 370/216 |
| 2007/0121615 | A1 * | 5/2007 | Weill | H04L 45/74 370/389 |
| 2010/0054152 | A1 * | 3/2010 | Foschiano | H04L 41/0886 370/253 |

(Continued)

OTHER PUBLICATIONS

M. Foschiano et al.; "Cisco Systems' Encapsulated Remote Switch Port Analyzer (ERSPAN)"; Feb. 2017; http://datatracker.ietf.org/drafts/current/.

(Continued)

*Primary Examiner* — Blake J Rubin
(74) *Attorney, Agent, or Firm* — Chamberlain, Hrdlicka, White, Williams & Aughtry

(57) ABSTRACT

A method and network device for overlay tunnel termination and mirroring spanning datacenters. Specifically, the method and network device disclosed herein entail the traversal of mirrored network traffic from datacenters lacking traffic analysis tools to other datacenters including the sought after traffic analysis tools. Further, the aforementioned traversal of mirrored network traffic may utilize virtual network layer overlay domain tunnels.

18 Claims, 21 Drawing Sheets

(56) References Cited

U.S. PATENT DOCUMENTS

| | | | |
|---|---|---|---|
| 2012/0250682 A1* | 10/2012 | Vincent | H04L 12/4633 370/390 |
| 2014/0016482 A1* | 1/2014 | de Silva | H04L 43/026 370/250 |
| 2015/0098472 A1* | 4/2015 | Choi | H04L 12/4633 370/392 |
| 2015/0120916 A1 | 4/2015 | Frattura et al. | |
| 2016/0156752 A1* | 6/2016 | Li | H04L 12/4633 370/474 |
| 2016/0182336 A1* | 6/2016 | Doctor | H04L 43/062 709/224 |
| 2016/0182342 A1* | 6/2016 | Singaravelu | H04L 43/103 370/253 |
| 2016/0352601 A1* | 12/2016 | Zhang | H04L 41/0645 |
| 2017/0134538 A1* | 5/2017 | Mahkonen | H04L 49/70 |
| 2017/0302569 A1* | 10/2017 | Ramaswamy | H04L 45/38 |
| 2017/0346736 A1* | 11/2017 | Chander | H04L 12/4641 |
| 2018/0069924 A1* | 3/2018 | Tumuluru | G06F 9/5077 |
| 2018/0097722 A1* | 4/2018 | Callard | H04L 45/38 |
| 2018/0242187 A1* | 8/2018 | Chuu | G06F 9/45558 |
| 2018/0294993 A1* | 10/2018 | Poulin | H04L 47/825 |
| 2018/0349163 A1* | 12/2018 | Gao | H04L 12/4641 |
| 2019/0297053 A1* | 9/2019 | Gaddehosur | H04L 12/4645 |
| 2019/0334880 A1 | 10/2019 | Wang et al. | |
| 2019/0386915 A1* | 12/2019 | Paul | H04L 12/4633 |
| 2020/0053163 A1* | 2/2020 | Ngo | H04L 63/029 |
| 2020/0068049 A1* | 2/2020 | Ngo | H04L 47/828 |
| 2020/0177629 A1* | 6/2020 | Hooda | H04L 47/746 |
| 2020/0220797 A1* | 7/2020 | Suzuki | H04L 12/4625 |
| 2020/0389469 A1* | 12/2020 | Litichever | H04L 63/1425 |
| 2021/0136141 A1* | 5/2021 | Tidemann | H04L 47/2483 |
| 2021/0136632 A1* | 5/2021 | Jin | H04W 36/0016 |

OTHER PUBLICATIONS

International Search Report dated Oct. 8, 2020, issued in the corresponding PCT Application No. PCT/US2020/039014 (3 pages).
Written Opinion dated Oct. 8, 2020, issued in the corresponding PCT Application No. PCT/US2020/039014 (9 pages).

\* cited by examiner

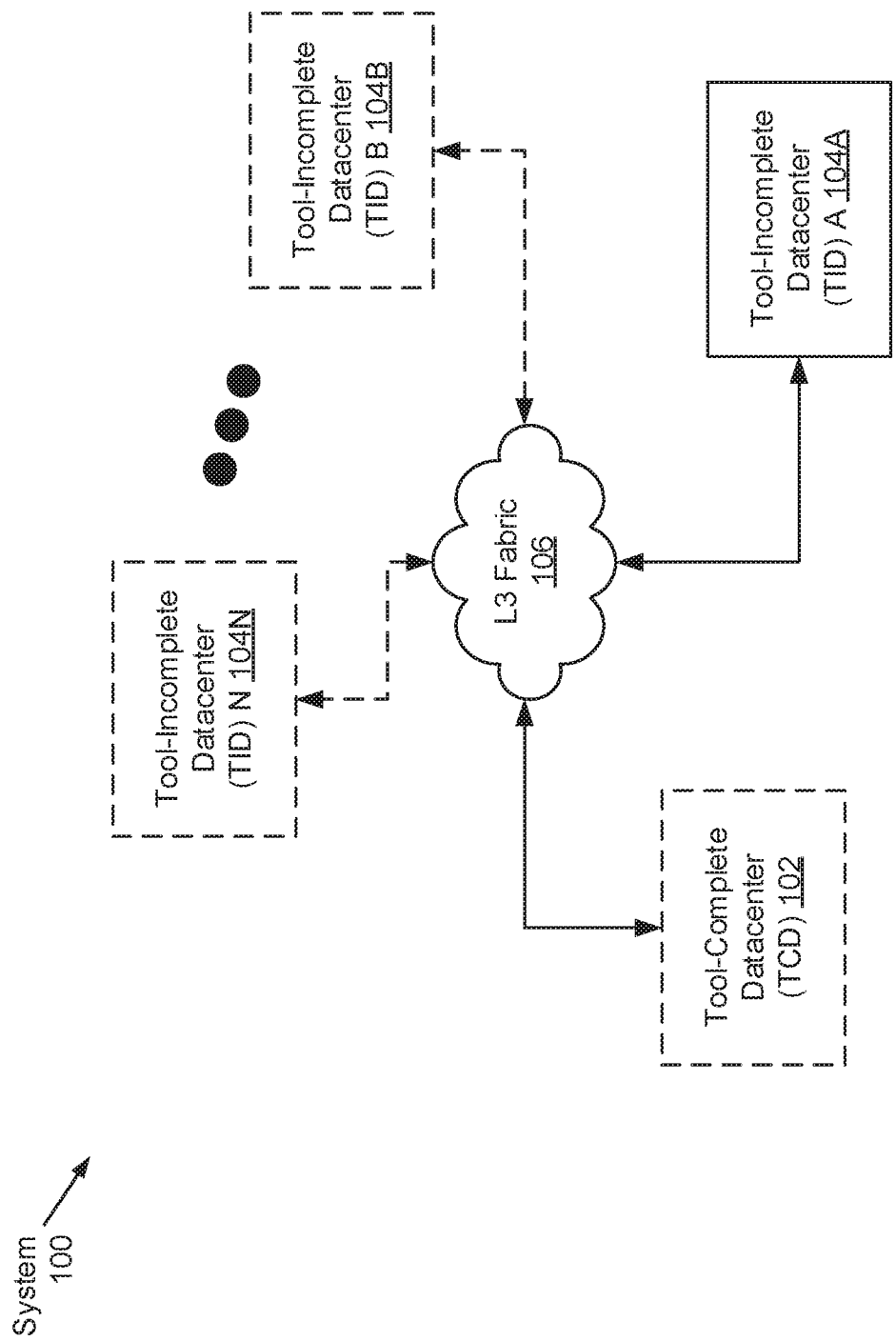

METHOD AND NETWORK DEVICE FOR OVERLAY TUNNEL TERMINATION AND MIRRORING SPANNING DATACENTERS

BACKGROUND

Organizations often deploy various information technology (IT) facilities, or datacenters, to disseminate and service requests for vast repositories of data. On occasion, while a new datacenter may be ramping up, certain traffic analyzing tools may yet to be installed and available therein.

SUMMARY

In general, in one aspect, embodiments relate to a method for processing network traffic. The method includes receiving a first original packet originating from a source host, examining the first original packet to obtain first monitoring pertinent information, obtaining, based on the first monitoring pertinent information, a first tool-reachable network address and a tunnel compatibility, encapsulating, based on the first tool-reachable network address and the tunnel compatibility, the first original packet into a tunnel packet, and transmitting the tunnel packet to a local service device.

In general, in one aspect, embodiments relate to a method for processing network traffic. The method includes receiving a security packet comprising a security termination network address and a tunnel packet, transmitting, based on the security termination network address, the security packet to a service device, receiving, from the service device, the tunnel packet including a tunnel termination network address and an original packet, and mirroring, based at least on the tunnel termination network address, either the tunnel packet or the original packet to a traffic analyzing tool.

In general, in one aspect, embodiments relate to a network device. The network device includes a plurality of ports including a port through which a security packet is received, wherein the security packet comprises a security termination network address and a tunnel packet, a memory including computer readable instructions, and a computer processor operatively connected to the plurality of ports and the memory, and when executing the computer readable instructions, is configured to transmit, based on the security termination network address, the security packet to a service device, receive, from the service device, the tunnel packet including a tunnel termination network address and an original packet, and mirror, based at least on the tunnel termination network address, either the tunnel packet or the original packet to a traffic analyzing tool.

Other aspects will be apparent from the following description and the appended claims.

BRIEF DESCRIPTION OF DRAWINGS

FIG. 1 shows a system in accordance with one or more embodiments.

DETAILED DESCRIPTION

Figure 2A:
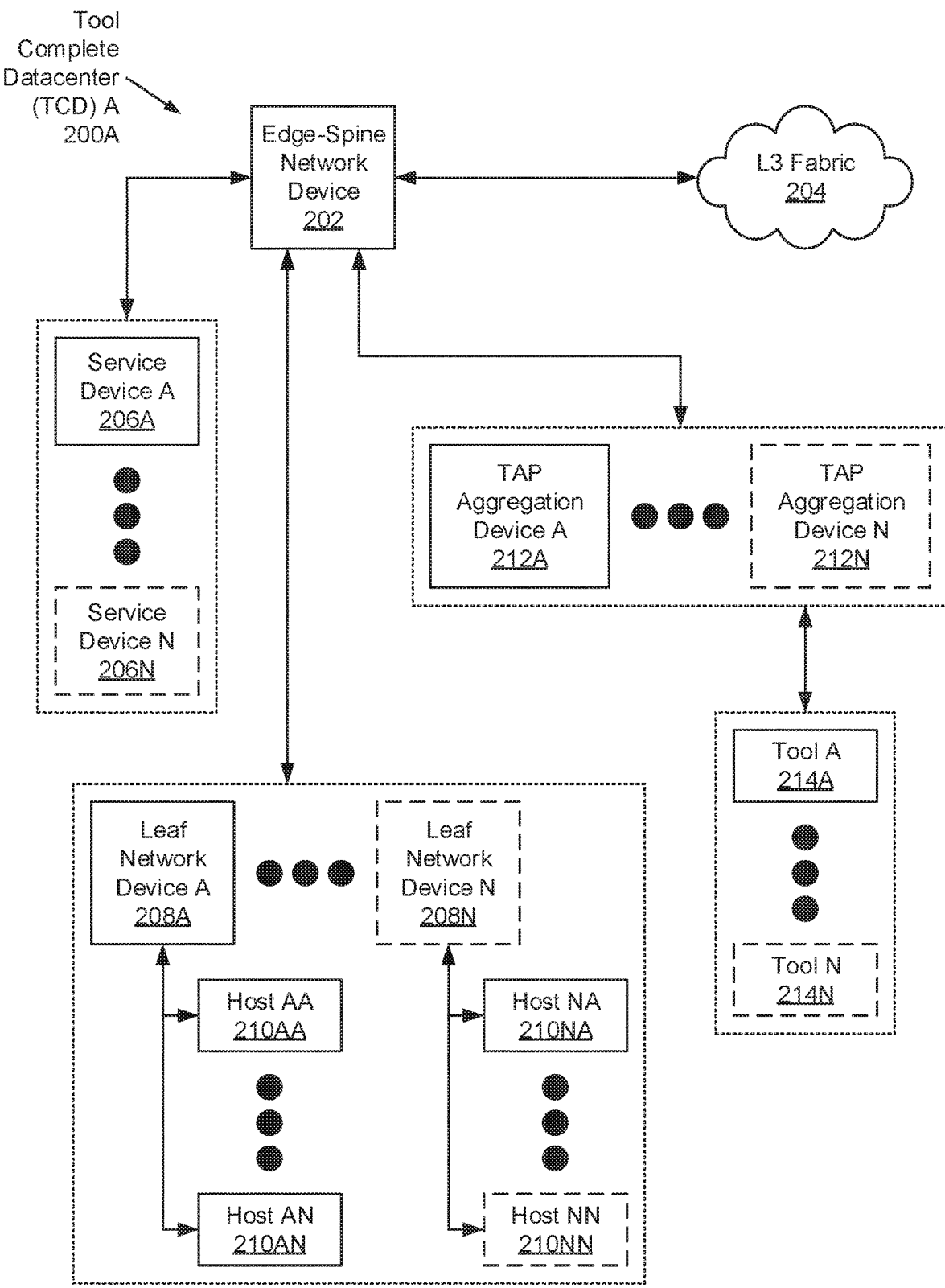
FIG. 2A shows a tool complete datacenter in accordance with one or more embodiments.
Figure 2B:
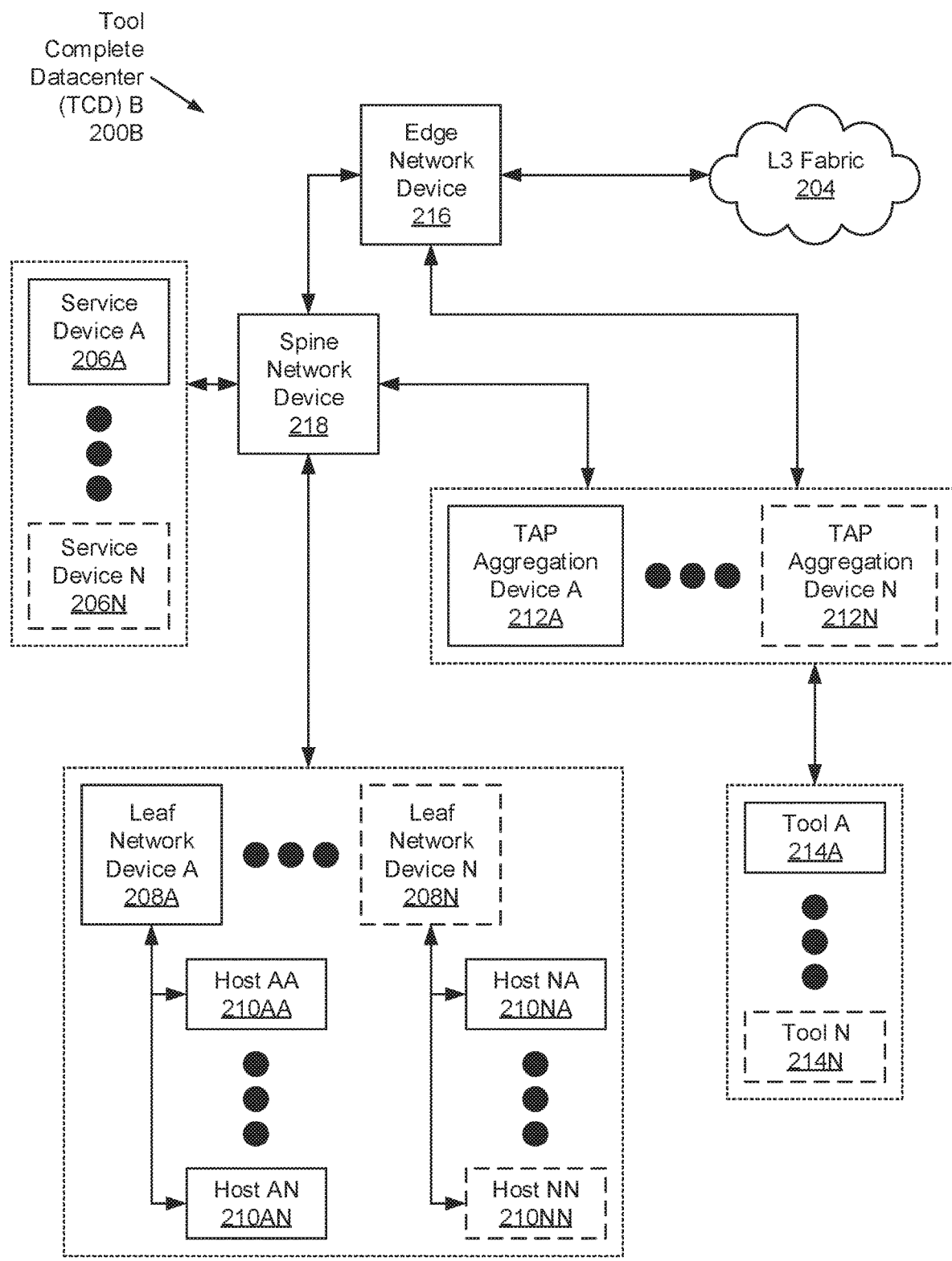
FIG. 2B shows a tool complete datacenter in accordance with one or more embodiments.

Specific embodiments will now be described in detail with reference to the accompanying figures. In the following detailed description of the embodiments, numerous specific details are set forth in order to provide a more thorough understanding. However, it will be apparent to one of ordinary skill in the art that the technology may be practiced without these specific details. In other instances, well-known features have not been described in detail to avoid unnecessarily complicating the description.

In the following description of FIGS. 1-10, any component described with regard to a figure, in various embodiments, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Throughout the application, the phrase 'operatively connected' may be used to describe a connection between components. As used hereinafter, the aforementioned phrase may refer to any direct (e.g., wired directly between two or more components) or indirect (e.g., wired and/or wireless connections between any number of operatively connected components) connection.

In general, embodiments relate to a method and network device for overlay tunnel termination and mirroring spanning datacenters. Specifically, one or more embodiments entail the traversal of mirrored network traffic from datacenters lacking traffic analysis tools to other datacenters including the sought after traffic analysis tools. Further, the aforementioned traversal of mirrored network traffic may utilize virtual network layer overlay domain tunnels.

On occasion, when a new datacenter is commissioned, delays in the provisioning of services, intended to be provided by the new datacenter, are not uncommon. Reasons causing the occurrence of these aforementioned delays vary. One such reason may fault the extensive backorder, shipping, and/or installation timelines surrounding at least a portion of the information technology (IT) equipment needed to implement these services. Accordingly, embodiments, relating to the method and network device disclosed herein, address the short- and/or long-term, limited local availability (or lack thereof) of certain services at these new "incomplete" datacenters. In one embodiment, these aforementioned certain services may pertain to network traffic analysis.

In terms of existing solutions to the above-mentioned dilemma, most (if not all) existing technologies pivot on using an encapsulated remote switched port analyzer (ERSPAN) protocol. Briefly, the ERSPAN protocol is directed to transporting mirrored network traffic over an Internet Protocol (IP) network or, more specifically, from one or more source ports on a source network device to one or more destination ports on a destination network device. Further, disadvantages associated with the ERSPAN protocol may include, but are not limited to: (a) the ERSPAN protocol being proprietary, which comes with licensing issues and maintenance fees; (b) the ERSPAN protocol extending an original mirrored packet to include either an additional 50 bytes (i.e., 14 byte Ethernet Frame+20 byte IP Header+8 byte Generic Route Encapsulation (GRE) Header+8 byte ERSPAN Type-II Header) or 56 bytes (i.e., 14 byte Ethernet Frame+20 byte IP Header+8 byte GRE Header+14 byte ERSPAN Type-III Header); and (c) the inability of the ERSPAN protocol to tunnel terminate and strip the GRE header before mirroring network traffic to tools, which cannot decapsulate the GRE header themselves, for analysis.

In contrast, advantages associated with embodiments, relating to the method and network device disclosed herein, may include, but are not limited to: (a) the technology being non-proprietary; (b) the technology utilizing transparent Ethernet bridging, which extends an original mirrored packet to include a lesser 42 additional bytes (i.e., 14 byte Ethernet Frame+20 byte IP Header+8 byte GRE Header); (c) the technology including the capability to tunnel terminate and strip the GRE header before mirroring network traffic to tools, which cannot decapsulate the GRE header themselves, for analysis—thereby circumventing the need to dedicate additional resources (e.g., memory and virtual port allocation for network traffic re-circulation) on these tools, which reduce bandwidth; and (d) the technology further including the capability to replicate or mirror the original network traffic to analysis tools, which translate to not requiring any additional processing to steer and/or filter the network traffic to/on any terminal access point aggregation devices (described below).

FIG. 1 shows a system in accordance with one or more embodiments. The system (100) may include multiple datacenters operatively connected to one another through a layer-3 (L3) fabric (106). Each datacenter may represent a tool-complete datacenter (TCD) (102) or a tool-incomplete datacenter (TID) (104A-104N). Each of these system (100) components is described below.

In one embodiment, a datacenter may generally refer to a facility that centralizes information technology (IT) operations and equipment associated with an organization. More specifically, the datacenter may refer to a repository where data, pertaining to the organization, may be stored, managed, processed, and disseminated. Further, a datacenter may substantively include, or may substantively lack, tools and/or collectors for data analysis. A TCD (102) may represent a datacenter that substantively includes a variety of these aforementioned tools and/or collectors, and is described in further detail below with respect to FIGS. 2A and 2B. A TID (104A-104N), on the other hand, may represent a datacenter that substantively lacks (e.g., may include a few or less of) these aforementioned tools and/or collectors, and is described in further detail below with respect to FIGS. 3A and 3B. Similarly, a TCD (102) may be defined in relation to a TID (104A-104N) based on a particular, desired tool. That is, even if a first datacenter includes more tools than a second (or peer) datacenter, if the first datacenter lacks the desired tool, which the second datacenter may have, then the first datacenter would be considered as the TID (104A-104N) whereas the second datacenter would be considered as the TCD (102).

In one embodiment, the L3 fabric (106) may represent a set of interconnected network devices or systems, which operatively connect the above-mentioned multiple datacenters (102, 104A-104N) to one another. Subsequently, the L3 fabric (106) may include functionality to facilitate communications between the datacenters. Further, the L3 fabric may include any combination of local area network (LAN) and/or wide area network (WAN) (e.g., Internet) segments, which may employ any combination of wired and/or wireless connections and communication protocols.

While FIG. 1 shows a configuration of components, other system (100) configurations may be used without departing from the scope of the technology.

FIG. 2A shows a TCD in accordance with one or more embodiments. The TCD (200A) may include an edge-spine network device (202) that operatively connects to one or more service devices (206A-206N), one or more leaf network devices (208A-208N), one or more terminal access point (TAP) aggregation devices (212A-212N), and a L3 fabric (204) for communication outside the TCD (200A). The TCD (200A) may further include set(s) of one or more hosts (210AA-210NN) that may operatively connect to a respective leaf network device (208A-208N), and one or more tools (214A-214N) that may operatively connect to the TAP aggregation device(s) (212A-212N). Each of these TCD (200A) components is described below.

In one embodiment, a network device (e.g., the edge-spine network device (202) or a leaf network device (208A-208N)) may represent a physical computing system (e.g., implemented through software and computer hardware) that facilitates communication and interaction between endpoints (e.g., service device(s) (206A-206N), host(s) (210AA-210NN), tool(s) (214A-214N), and L3 fabric (204)) of the TCD (200A). Further, a network device may include persistent storage, memory (e.g., random access memory (RAM), shared memory, etc.), one or more computer processors (e.g., integrated circuits, switch chips, network processors, etc.), and two or more physical network interfaces (also referred to as ports). The computer processor(s) may be programmed to determine out of which network interface, on the network device, to forward network traffic (e.g., data packets). To that extent, in general, a network device may include functionality to receive network traffic from a source device (or previous hop) through a network interface or port, and determine whether to: (a) drop the network traffic; (b) process the network traffic according to a configuration of the network device; and/or (c) send the network traffic, based on the processing, out through another network interface or port, to a destination device (or next hop).

In one embodiment, how a network device processes network traffic may depend, at least in part, on whether the network device operates as a layer-2 (L2) switch or a L3 switch (also referred to as a multilayer switch), which may perform at least some functions of a router. If the network device operates as a L2 switch, the network device may use a destination MAC address along with one or more forwarding data structures and/or policies to determine out of which network interface to send the network traffic towards a next hop (e.g., another network device) or a destination (e.g., an endpoint). Alternatively, if the network device operates as a L3 switch, the network device may use a destination IP address along with one or more routing data structures and/or policies to determine out of which network interface to send the network traffic towards a next hop or destination. Furthermore, if the network device operates as a multilayer switch, the network device may include functionality to process network traffic using both MAC addresses and IP addresses.

In one embodiment, the persistent storage on a network device may include any type of non-transitory computer readable medium that includes instructions (or computer readable program code), which when executed by the above-mentioned computer processor(s), enable the network device to perform any of the functionalities described herein (see e.g., FIGS. 6A-9C). Moreover, examples of a network device may include, but are not limited to, a switch, a router, and a multilayer switch. Further, a network device is not limited to the aforementioned specific examples.

In one embodiment, the edge-spine network device (202) may represent a combination (or hybrid) network device that operates as both an edge network device and a spine network device. An edge network device may represent any network device (described above) that may further perform one or more functionalities characteristic of a gateway—i.e., a device that serves as a junction between the above-mentioned TCD (200A) components and one or more external entities or networks (e.g., the L3 fabric (204)). These gateway functionalities may include any subset or all of the following operations: serving as an entry and exit point for a network or datacenter (e.g., the TCD (200A)); enabling communications to and from out-of-bounds computing systems (i.e., physical or virtual computing systems residing outside the network or datacenter); and facilitating dissimilar network compatibility through network protocol conversion. One of ordinary skill will appreciate that a gateway or an edge network device may perform other functionalities without departing from the scope of the technology.

In one embodiment, a spine network device may represent any network device (described above) that may provide traffic-forwarding operations for the leaf network device(s) (208A-208N) (described below). Traffic-forwarding operations may entail aggregating network traffic from the leaf network device(s) (208A-208N) and, subsequently, performing network traffic bridging (i.e., data-link layer or L2 forwarding), network traffic routing (i.e., network layer or L3 forwarding), or a combination thereof. Specifically, however, a spine network device may enable interconnectivity between leaf network devices (208A-208N) when more than one of the latter exists throughout a network or datacenter (e.g., the TCD (200A)). One of ordinary skill will appreciate that a spine network device may perform other roles without departing from the scope of the technology.

In one embodiment, a service device (206A-206N) (also referred to as a network appliance) may represent a physical or virtual computing system that provides a networking service—usually requiring deep network traffic inspection and/or processing. A service device (206A-206N) may include at least one or more computer processors, memory, and two or more physical network interfaces. Further, a service device (206A-206N) may include functionality to process network traffic, directed thereto, in accordance with the configuration of, and the specific service thus provided by, the service device (206A-206N). Processing of the network traffic may entail, for example, filtering, mirroring, storing, forwarding or blocking, transcoding, encrypting and decrypting, logging, redirecting or re-routing, authenticating, or any combination thereof. Moreover, examples of a service device (206A-206N) may include, but are not limited to, a network security service (e.g., a firewall device, a denial of service (DOS) attack scrubber, a virtual private network (VPN) device, an intrusion detection device, etc.), a network filtering device (e.g., a proxy server, a web content filter, etc.), a network data cache (e.g., a web-cache device), and a network management device (e.g., a load balancing device, a bandwidth management device, a WAN optimization or acceleration device, etc.).

In one embodiment, a leaf network device (208A-208N) (also referred to as a top-of-rack network device or an access network device) may represent any network device (described above) that directly interacts with the end-node devices (e.g., the host(s) (210AA-210NN)). To that extent, a leaf network device (208A-208N) may be responsible for facilitating the delivery of network traffic to and from a respective set of directly-connected hosts (210AA-210NN), which may be said to reside behind the leaf network device (208A-208N). One of ordinary skill will appreciate that a leaf network device (208A-208N) may perform other functionalities without departing from the scope of the technology.

In one embodiment, a host (210AA-210NN) may represent any physical computing system that issues and/or services requests, either locally or over the L3 fabric (204). A host (210AA-210NN) may include, but is not limited to, one or more computer processors, memory, and two or more physical network interfaces. Further, a host (210AA-210NN) may include functionality to generate, receive, transmit, and/or process network traffic (e.g., data packets). Examples of a host (210AA-210NN) may include, but are not limited to, a server (e.g., a database server, a dynamic host configuration protocol (DHCP) server, an application server, a file server, a print server, a mail server, or any other server), a desktop computer, a mobile device (e.g., a laptop computer, a smartphone, a personal digital assistant (PDA), a tablet computer, or any other portable computing system), or any other type of computing system that includes at least the aforementioned minimum requirements.

In one embodiment, a TAP aggregation device (212A-212N) may represent a physical computing system that non-disruptively monitors network traffic flows between network end points (e.g., source and destination hosts). To that extent, a TAP aggregation device (212A-212N) may include functionality to: replicate the monitored network traffic flows to obtain network traffic flow copies, while the monitored network traffic flows traverse unimpeded; and direct the network traffic flow copies to directly-connected, physical or virtual computing systems (e.g., tools (214A-214N)) for deep network traffic inspection and/or processing. One of ordinary skill will appreciate that a TAP aggregation device (212A-212N) may perform other functionalities without departing from the scope of the technology.

In one embodiment, a tool (214A-214N) may represent any physical or virtual computing system (e.g., implemented through software and/or computer hardware) that may be configured to analyze network traffic by way of deep packet inspection (DPI) and packet processing. The analysis of network traffic may be directed to, for example, network performance monitoring, troubleshooting, capacity planning, and intrusion detection and/or prevention.

While FIG. 2A shows a configuration of components, other TCD (200A) configurations may be used without departing from the scope of the technology. For example, refer to FIG. 2B, which shows an alternative TCD (200B) configuration in accordance with one or more embodiments. Specifically, in FIG. 2B, rather than employing an edge-spine network device (202) as shown above, two separate network devices—i.e., an edge network device (216) and a spine network device (218)—divide the above-described functionalities of the edge-spine network device (202). Further, with respect to connections, the edge network device (216) may operatively connect to the spine network device (218), the TAP aggregation device(s) (212A-212N), and the L3 fabric (204). Meanwhile, the spine network device (218) may operatively connect to the service device(s) (206A-206N), the leaf network device(s) (208A-208N), the TAP aggregation device(s) (212A-212N), and the edge network device (216).

Figure 3A:
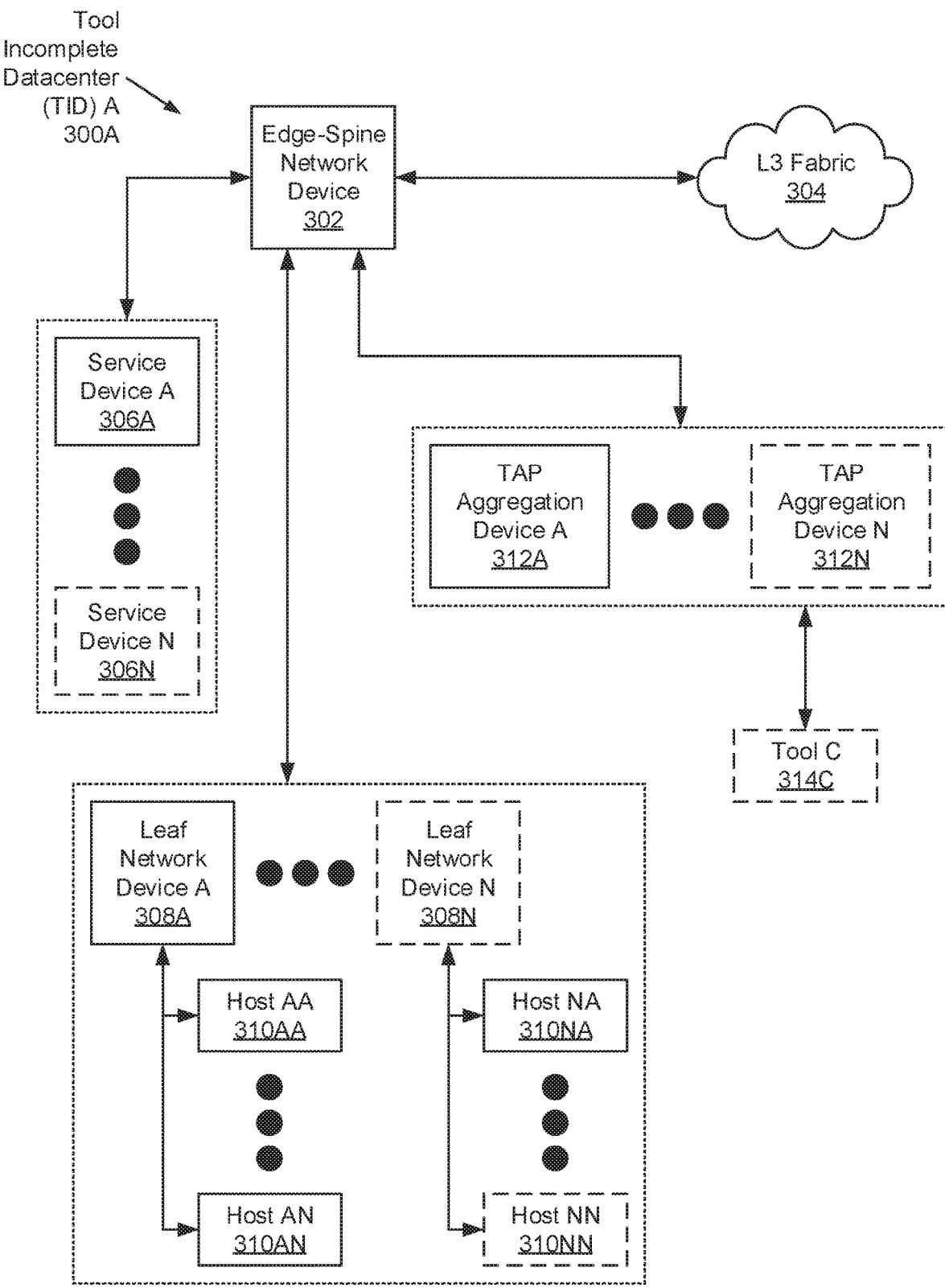
FIG. 3A shows a tool incomplete datacenter in accordance with one or more embodiments.
Figure 3B:
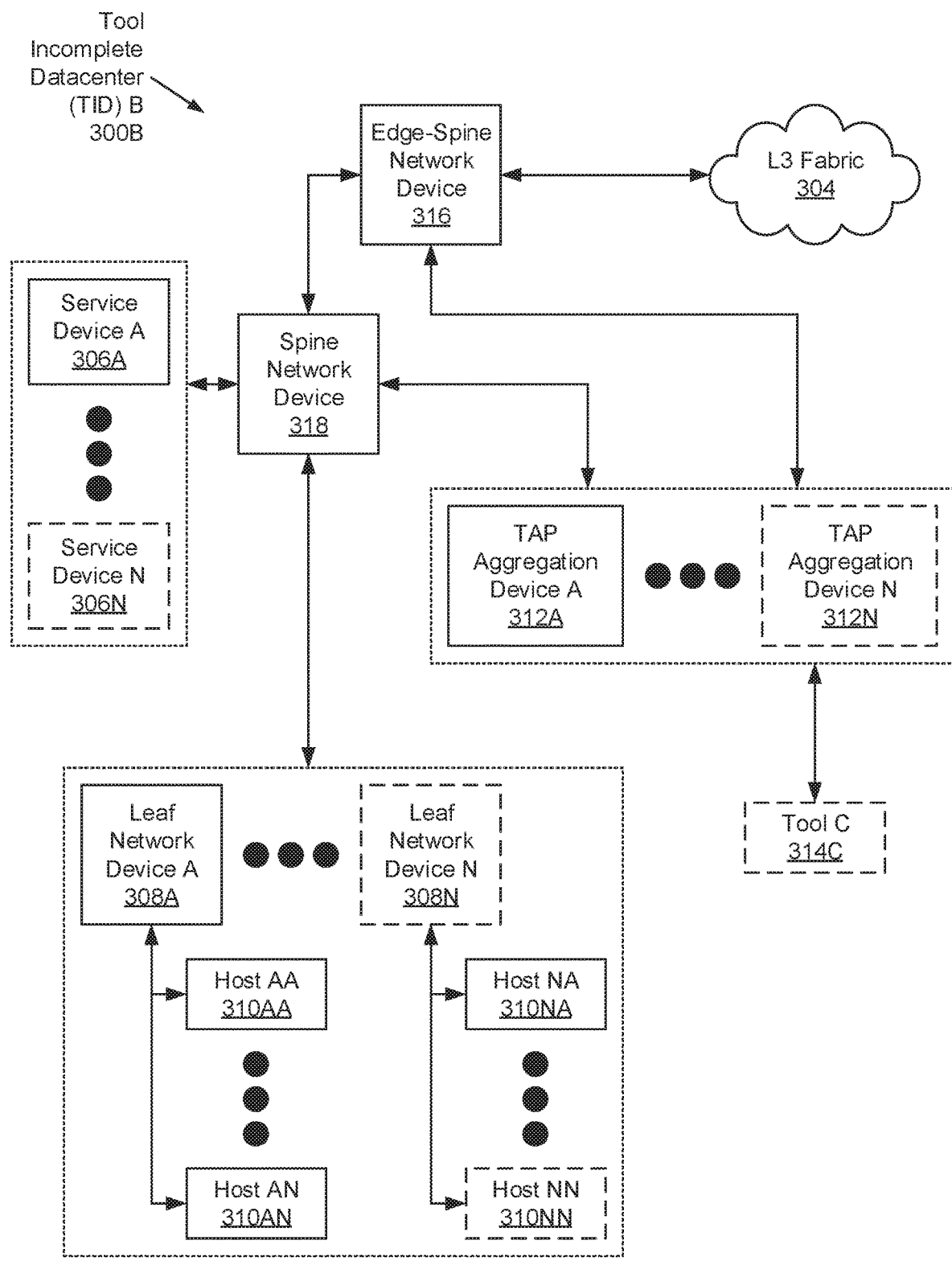
FIG. 3B shows a tool incomplete datacenter in accordance with one or more embodiments.

FIG. 3A shows a TID in accordance with one or more embodiments. The TID (300A) may include an edge-spine network device (302) that operatively connects to one or more service devices (306A-306N), one or more leaf network devices (308A-308N), one or more TAP aggregation devices (312A-312N), and a L3 fabric (304). The TID (300A) may further include set(s) of one or more hosts (310AA-310NN) that may operatively connect to a respective leaf network device (308A-308N), and a tool (314C) (if any) that may operatively connect to the TAP aggregation device(s) (312A-312N). Each of these TID (300A) components is described below.

In one embodiment, a network device (e.g., the edge-spine network device (302) or a leaf network device (308A-308N)) may represent a physical computing system (e.g., implemented through software and computer hardware) that facilitates communication and interaction between endpoints (e.g., service device(s) (306A-306N), host(s) (310AA-310NN), the tool (314C) (if any), and L3 fabric (304)) of the TID (300A). Further, a network device may include persistent storage, memory (e.g., random access memory (RAM), shared memory, etc.), one or more computer processors (e.g., integrated circuits, switch chips, network processors, etc.), and two or more physical network interfaces (also referred to as ports). The computer processor(s) may be programmed to determine out of which network interface, on the network device, to forward network traffic (e.g., data packets). To that extent, in general, a network device may include functionality to receive network traffic from a source device (or previous hop) through a network interface or port, and determine whether to: (a) drop the network traffic; (b) process the network traffic according to a configuration of the network device; and/or (c) send the network traffic, based on the processing, out through another network interface or port, to a destination device (or next hop).

In one embodiment, how a network device processes network traffic may depend, at least in part, on whether the network device operates as a layer-2 (L2) switch or a L3 switch (also referred to as a multilayer switch), which may perform at least some functions of a router. If the network device operates as a L2 switch, the network device may use a destination MAC address along with one or more forwarding data structures and/or policies to determine out of which network interface to send the network traffic towards a next hop (e.g., another network device) or a destination (e.g., an endpoint). Alternatively, if the network device operates as a L3 switch, the network device may use a destination IP address along with one or more routing data structures and/or policies to determine out of which network interface to send the network traffic towards a next hop or destination. Furthermore, if the network device operates as a multilayer switch, the network device may include functionality to process network traffic using both MAC addresses and IP addresses.

In one embodiment, the persistent storage on a network device may include any type of non-transitory computer readable medium that includes instructions (or computer readable program code), which when executed by the above-mentioned computer processor(s), enable the network device to perform any of the functionalities described herein (see e.g., FIGS. 6A-9C). Moreover, examples of a network device may include, but are not limited to, a switch, a router, and a multilayer switch. Further, a network device is not limited to the aforementioned specific examples.

In one embodiment, the edge-spine network device (302) may represent a combination (or hybrid) network device that operates as both an edge network device and a spine network device. An edge network device may represent any network device (described above) that may further perform one or more functionalities characteristic of a gateway—i.e., a device that serves as a junction between the above-mentioned TID (300A) components and one or more external entities or networks (e.g., the L3 fabric (304)). These gateway functionalities may include any subset or all of the following operations: serving as an entry and exit point for a network or datacenter (e.g., the TID (300A)); enabling communications to and from out-of-bounds computing systems (i.e., physical or virtual computing systems residing outside the network or datacenter); and facilitating dissimilar network compatibility through network protocol conversion. One of ordinary skill will appreciate that a gateway or an edge network device may perform other functionalities without departing from the scope of the technology.

In one embodiment, a spine network device may represent any network device (described above) that may provide traffic-forwarding operations for the leaf network device(s) (308A-308N) (described below). Traffic-forwarding operations may entail aggregating network traffic from the leaf network device(s) (308A-308N) and, subsequently, performing network traffic bridging (i.e., data-link layer or L2 forwarding), network traffic routing (i.e., network layer or L3 forwarding), or a combination thereof. Specifically, however, a spine network device may enable interconnectivity between leaf network devices (308A-308N) when more than one of the latter exists throughout a network or datacenter (e.g., the TID (300A)). One of ordinary skill will appreciate that a spine network device may perform other roles without departing from the scope of the technology.

In one embodiment, a service device (306A-306N) (also referred to as a network appliance) may represent a physical or virtual computing system that provides a networking service—usually requiring deep network traffic inspection and/or processing. A service device (306A-306N) may include at least one or more computer processors, memory, and two or more physical network interfaces. Further, a service device (306A-306N) may include functionality to process network traffic, directed thereto, in accordance with the configuration of, and the specific service thus provided by, the service device (306A-306N). Processing of the network traffic may entail, for example, filtering, mirroring, storing, forwarding or blocking, transcoding, encrypting and decrypting, logging, redirecting or re-routing, authenticating, or any combination thereof. Moreover, examples of a service device (306A-306N) may include, but are not limited to, a network security device (e.g., a firewall device, a denial of service (DOS) attack scrubber, a virtual private network (VPN) device, an intrusion detection device, etc.), a network filtering device (e.g., a proxy server, a web content filter, etc.), a network data cache (e.g., a web-cache device), and a network management device (e.g., a load balancing device, a bandwidth management device, a WAN optimization or acceleration device, etc.).

In one embodiment, a leaf network device (308A-308N) (also referred to as a top-of-rack network device or an access network device) may represent any network device (described above) that directly interacts with the end-node devices (e.g., the host(s) (310AA-310NN)). To that extent, a leaf network device (308A-308N) may be responsible for facilitating the delivery of network traffic to and from a respective set of directly-connected hosts (310AA-310NN), which may be said to reside behind the leaf network device (308A-308N). One of ordinary skill will appreciate that a leaf network device (308A-308N) may perform other functionalities without departing from the scope of the technology.

In one embodiment, a host (310AA-310NN) may represent any physical computing system that issues and/or services requests, either locally or over the L3 fabric (304). A host (310AA-310NN) may include, but is not limited to, one or more computer processors, memory, and two or more physical network interfaces. Further, a host (310AA-310NN) may include functionality to generate, receive, transmit, and/or process network traffic (e.g., data packets). Examples of a host (310AA-310NN) may include, but are not limited to, a server (e.g., a database server, a dynamic host configuration protocol (DHCP) server, an application server, a file server, a print server, a mail server, or any other server), a desktop computer, a mobile device (e.g., a laptop computer, a smartphone, a personal digital assistant (PDA), a tablet computer, or any other portable computing system), or any other type of computing system that includes at least the aforementioned minimum requirements.

In one embodiment, a TAP aggregation device (312A-312N) may represent a physical computing system that non-disruptively monitors network traffic flows between network end points (e.g., source and destination hosts). To that extent, a TAP aggregation device (312A-312N) may include functionality to: replicate the monitored network traffic flows to obtain network traffic flow copies, while the monitored network traffic flows traverse unimpeded; and direct the network traffic flow copies to directly-connected, physical or virtual computing systems (e.g., tools (314C)) for deep network traffic inspection and/or processing. One of ordinary skill will appreciate that a TAP aggregation device (312A-312N) may perform other functionalities without departing from the scope of the technology.

In one embodiment, the tool (314C) (if any) may represent any physical or virtual computing system (e.g., implemented through software and/or computer hardware) that may be configured to analyze network traffic by way of deep packet inspection (DPI) and packet processing. The analysis of network traffic may be directed to, for example, network performance monitoring, troubleshooting, capacity planning, and intrusion detection and/or prevention.

While FIG. 3A shows a configuration of components, other TID (300A) configurations may be used without departing from the scope of the technology. For example, refer to FIG. 3B, which shows an alternative TID (300B) configuration in accordance with one or more embodiments. Specifically, in FIG. 3B, rather than employing an edge-spine network device (302) as shown above, two separate network devices—i.e., an edge network device (316) and a spine network device (318)—divide the above-described functionalities of the edge-spine network device (302). Further, with respect to connections, the edge network device (316) may operatively connect to the spine network device (318), the TAP aggregation device(s) (312A-312N), and the L3 fabric (304). Meanwhile, the spine network device (318) may operatively connect to the service device(s) (306A-306N), the leaf network device(s) (308A-308N), the TAP aggregation device(s) (312A-312N), and the edge network device (316).

Figure 4A:
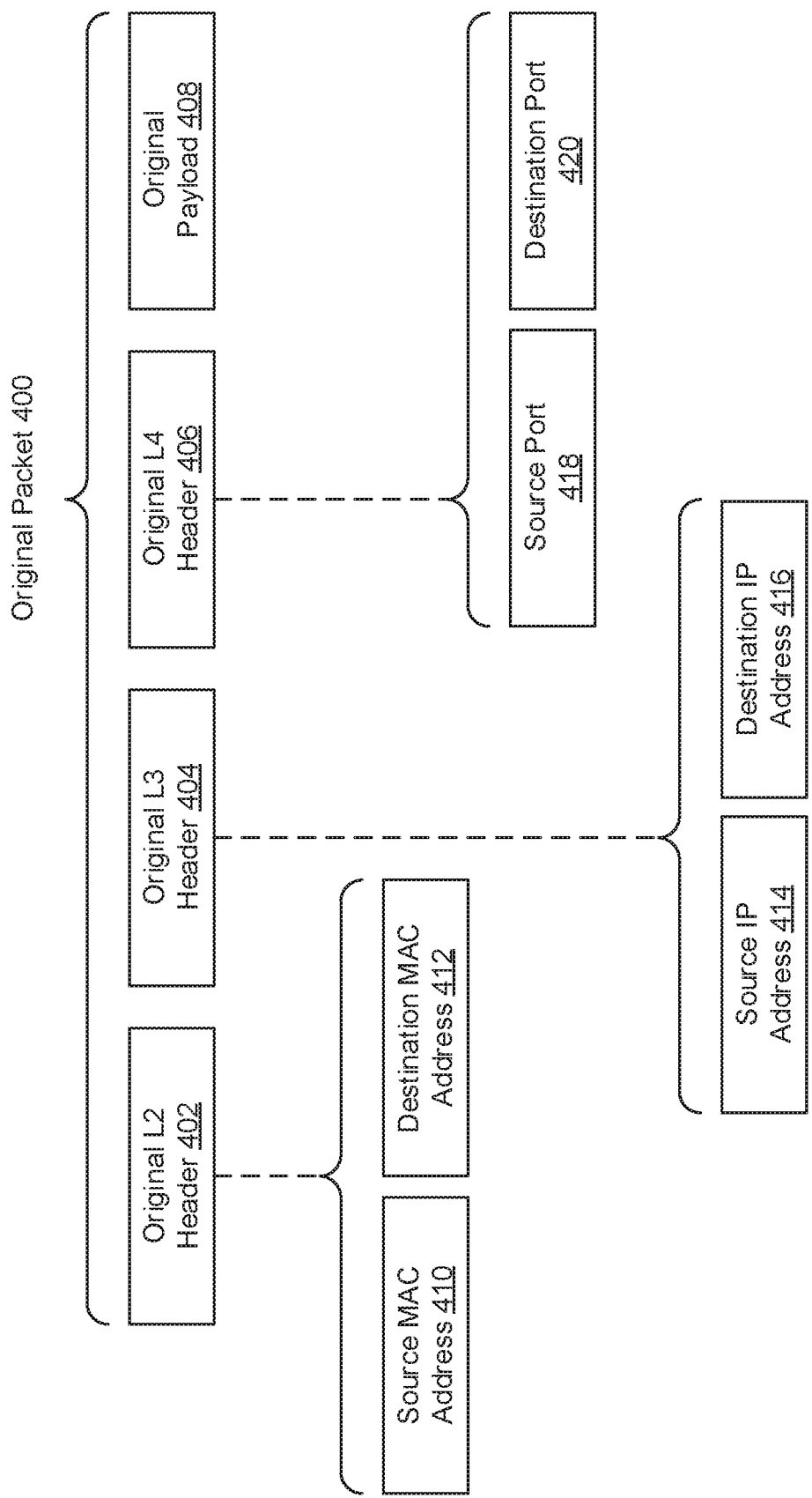
FIG. 4A shows an original packet in accordance with one or more embodiments.

FIG. 4A shows an original packet in accordance with one or more embodiments. The original packet (400) may be representative of a data-link layer or L2 protocol data unit (PDU) (also referred to as an Ethernet or MAC frame). The original packet (400) may be generated by end-node devices such as, for example, the host(s) residing in a TCD (see e.g., FIGS. 2A and 2B) and/or a TID (see e.g., FIGS. 3A and 3B). Further, the original packet (400) may include, but is not limited to, an original L2 header (402), an original L3 header (404), an original L4 header (406), and an original payload (408). Each of these original packet (400) components is described below.

In one embodiment, the original L2 header (402) may collectively encompass various information required for data-link layer bridging of the original packet (400) through a network. Specifically, the original L2 header (402) may include, but is not limited to, a source MAC address (410) and a destination MAC address (412). The source MAC address (410) may represent a unique data-link layer identifier assigned to, or associated with, a source host—i.e., the host responsible for generating the original packet (400). Meanwhile, the destination MAC address (412) may represent a unique data-link layer identifier assigned to, or associated with, a destination host—i.e., the host to which the original packet (400) may be directed or addressed.

In one embodiment, the original L3 header (404) may collectively encompass various information required for network layer routing of the original packet (400) through a network. Specifically, the original L3 header (404) may include, but is not limited to, a source IP address (414) and a destination IP address (416). The source IP address (414) may represent a unique network layer identifier assigned to, or associated with, a source host (described above). Meanwhile, the destination IP address (416) may represent a unique network layer identifier assigned to, or associated with, a destination host (described above).

In one embodiment, the original L4 header (406) may collectively encompass various information required for transport layer forwarding of the original packet (400)

through a network. Specifically, the original L4 header (406) may include, but is not limited to, a source network interface (or port) (418) and a destination network interface (or port) (420). The source port (418) may reference a physical network interface on a source host—i.e., the host responsible for generating the original packet (400)—whereon a source application or computer program may be executing and using the physical network interface on the source host. On the other hand, the destination port (420) may reference a physical network interface on a destination host—i.e., the host to which the original packet (400) may be directed or addressed—whereon a destination application or computer program may be executing and using the physical network interface on the destination host.

In one embodiment, the original payload (408) may refer to the content (or data) that a source host may be attempting to transmit to a destination host. The enclosed content may encompass, for example, information sought by the destination host (which may have been requested earlier), a query posed by the source host to the destination host, mutually exchanged data such as authentication information necessary for secure communications, etc. Further, though not shown, the original L3 header (404), the original L4 header (406), and the original payload (408), collectively, may substantively form a network layer or L3 PDU (also referred to as an IP packet).

Figure 4B:
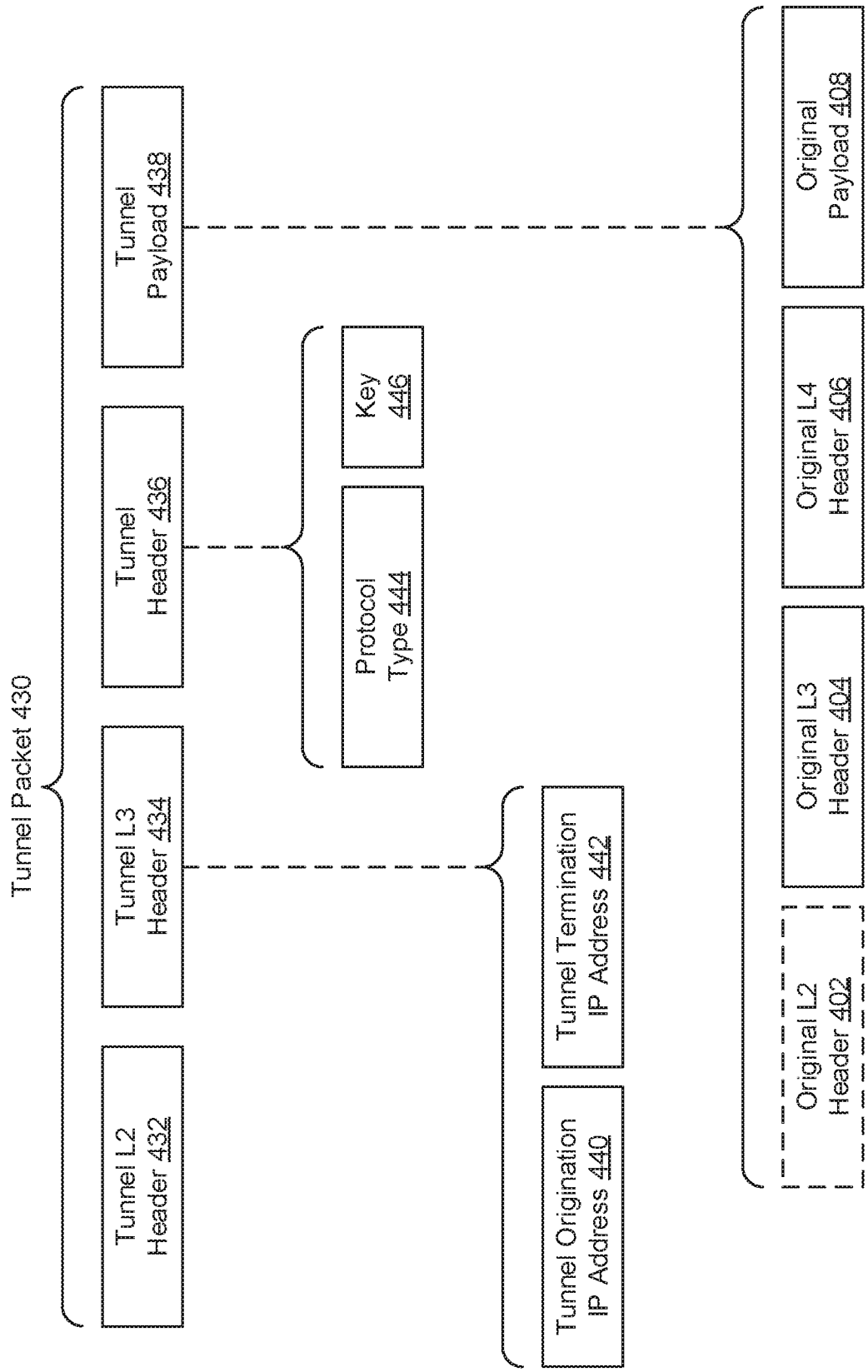
FIG. 4B shows a tunnel packet in accordance with one or more embodiments.

FIG. 4B shows a tunnel packet in accordance with one or more embodiments. The tunnel packet (430) may be representative of a virtual network layer or virtual L3 (VL3) protocol data unit (PDU) capable of traversing networks through overlay domain tunnels. By way of an example, the tunnel packet (430) may traverse networks through overlay domain tunnels configured using the generic routing encapsulation (GRE) protocol. By way of other examples, the tunnel packet (430) may alternatively traverse networks through overlay domain tunnels configured using the virtual extensible local area network (VXLAN) protocol, the multi-protocol label switching (MPLS) protocol, or any other existing or future developed network tunneling protocol. The tunnel packet (430) may be generated through the encapsulation of an original packet (see e.g., FIG. 4A), which may be performed by a VL3 overlay domain endpoint (VODE). A VODE may refer to a logical intelligence (i.e., software), executing on the underlying hardware of a physical computing system (e.g., a network device), that may be tasked with originating and/or terminating virtual layer-3 (VL3) overlay domain tunnels. Moreover, the tunnel packet (430) may include, but is not limited to, a tunnel L2 header (432), a tunnel L3 header (434), a tunnel header (436), and a tunnel payload (438). Each of these tunnel packet (430) components is described below.

In one embodiment, the tunnel L2 header (432) may collectively encompass various information required for data-link layer bridging of the tunnel packet (430) through a network. Specifically, the tunnel L2 header (432) may include, but is not limited to, a source MAC address (not shown) and a destination MAC address (not shown). The source MAC address may represent a unique data-link layer identifier assigned to, or associated with, a source host—i.e., the host responsible for generating an original packet (not shown) that which the tunnel packet (430) encapsulates. Meanwhile, the destination MAC address may represent a unique data-link layer identifier assigned to, or associated with, a destination host—i.e., the host to which the original packet, that which the tunnel packet (430) encapsulates, may be directed or addressed.

In one embodiment, the tunnel L3 header (434) may collectively encompass various information required for network layer routing of the tunnel packet (430) through a network. Specifically, the tunnel L3 header (434) may include, but is not limited to, a tunnel origination IP address (440) and a tunnel termination IP address (442). The tunnel origination IP address (440) may represent a unique network layer identifier assigned to, or associated with, a tunnel origination end point. A tunnel origination end point may refer to a VODE (described above) responsible for encapsulating an original packet, to thereby generate the tunnel packet (430). Alternatively, the tunnel origination end point may refer to the physical computing system (e.g., network device) whereon the aforementioned VODE may be executing. Meanwhile, the tunnel termination IP address (442) may represent a unique network layer identifier assigned to, or associated with, a tunnel termination end point. A tunnel termination end point may refer to a VODE (described above) responsible for decapsulating the tunnel packet (430), to thereby obtain an original packet enclosed therein. Alternatively, the tunnel termination end point may refer to the physical computing system (e.g., network device) whereon the aforementioned VODE may be executing.

In one embodiment, the tunnel header (436) may collectively encompass various information (or metadata) descriptive of, and/or pertinent to, the overlay domain tunnels used by the tunnel packet (430). Specifically, the tunnel header (436) may include, but is not limited to, a protocol type (444) and a key (446). The protocol type (444) may refer to a fixed-length binary string, which may reflect a given prescribed numerical value for a given protocol family (e.g., IP protocol family, systems network architecture (SNA) protocol family, address resolution protocol (ARP) protocol family, Ethernet protocol family, etc.) with which the tunnel payload (438) may be associated. The key (446) (also referred to as a tunnel key), on the other hand, may refer to a fixed-length binary string, which may reflect a numerical value that may map to context information, not present in the tunnel L2 header (432), the tunnel L3 header (434), and/or the tunnel payload (438). By way of an example, a given numerical value may be interpreted and mapped to context information directed to processing the tunnel packet (430). The key (446) (if any is disclosed in the tunnel header (436)) is not limited to the aforementioned example.

In one embodiment, the tunnel payload (438) may refer to the content (or data) that may be encapsulated and transported across networks using overlay domain tunneling. More specifically, the tunnel payload (438) may substantively encompass an original packet (see e.g., FIG. 4A), which may include information that a source host may be attempting to transmit to a destination host. Accordingly, the tunnel payload (438) may include, but is not limited to, an original L2 header (402), an original L3 header (404), an original L4 header (406), and an original payload (408) (described above).

Figure 4C:
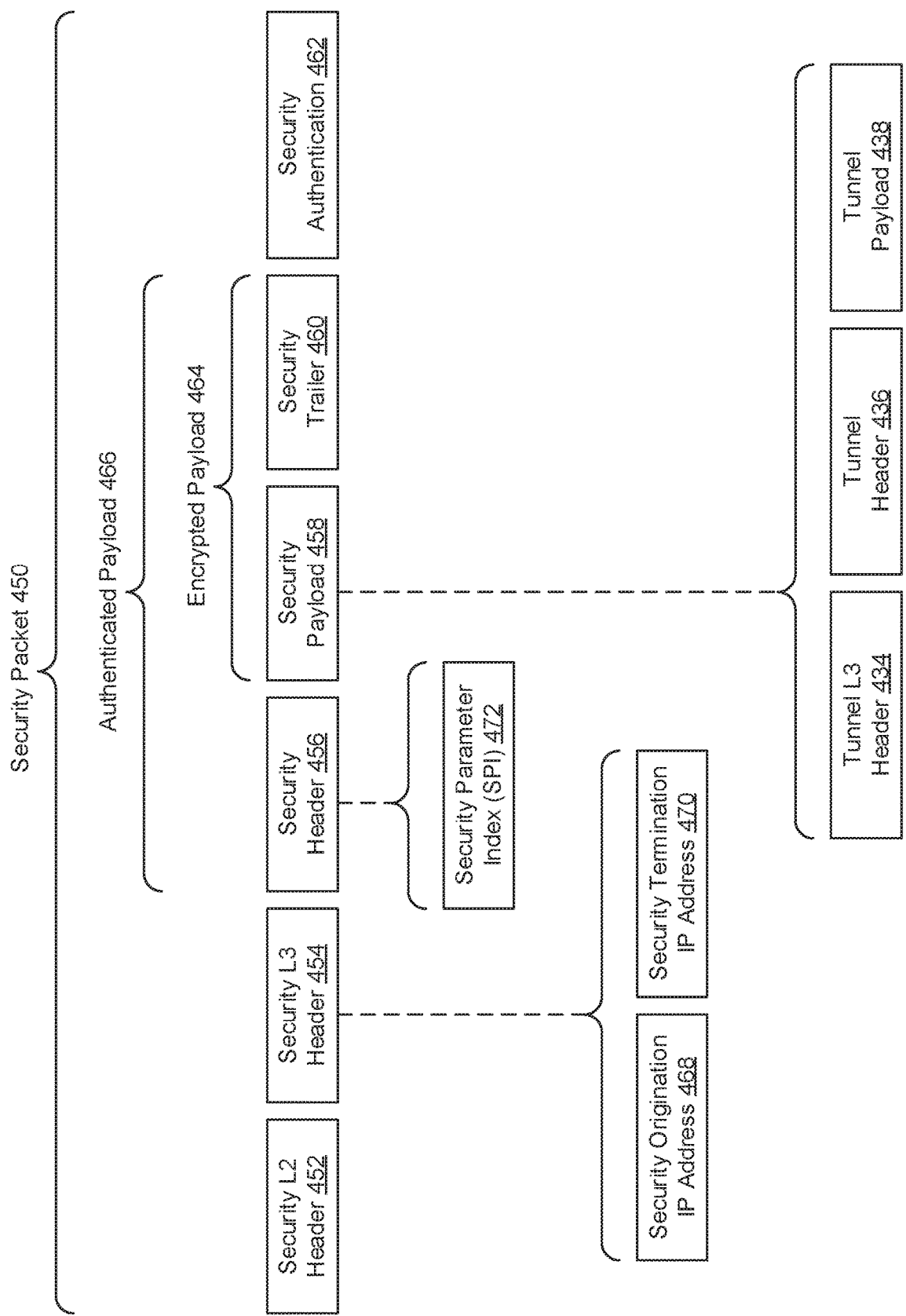
FIG. 4C shows a security packet in accordance with one or more embodiments.

FIG. 4C shows a security packet in accordance with one or more embodiments. The security packet (450) may be representative of an encrypted and/or authenticated virtual network layer or virtual L3 (VL3) protocol data unit (PDU) capable of traversing networks through secure overlay domain tunnels. By way of an example, the security packet (450) may traverse networks through secure overlay domain tunnels configured using the virtual private network (VPN) protocol. The VPN protocol may establish secure VPN connections using various sub-protocols. Examples of these sub-protocols may include, but are not limited to, the IP security (IPsec) protocol and the secure sockets layer (SSL)

protocol. Furthermore, within the former sub-protocol, various other protocols may be employed to implement the different features that the IPsec protocol offers. For example, an authentication header (AH) protocol may be used to implement an authentication feature, as well as a data integrity feature, of the IPsec protocol. By way of another example, an encapsulating security payload (ESP) protocol may be used to implement an encryption feature, as well as the other two aforementioned features, of the IPsec protocol.

In one embodiment, the security packet (450) may be generated through the encryption and/or authentication of a tunnel packet (see e.g., FIG. 4B), which may be performed by a VL3 overlay domain endpoint (VODE). A VODE may refer to a logical intelligence (i.e., software), executing on the underlying hardware of a physical computing system (e.g., a network device), that may be tasked with originating and/or terminating virtual layer-3 (VL3) overlay domain tunnels. Moreover, the security packet (450) may include, but is not limited to, a security L2 header (452), a security L3 header (454), a security header (456), a security payload (458), a security trailer (460), and a security authentication (462). Collectively, the security payload (458) and the security trailer (460) may constitute an encrypted payload (464), whereas the security header (456) and the aforementioned encrypted payload (464) may collectively constitute an authenticated payload (466). Each of these security packet (450) components is described below.

In one embodiment, the security L2 header (452) may collectively encompass various information required for data-link layer bridging of the security packet (450) through a network. Specifically, the security L2 header (452) may include, but is not limited to, a source MAC address (not shown) and a destination MAC address (not shown). The source MAC address may represent a unique data-link layer identifier assigned to, or associated with, a source host—i.e., the host responsible for generating an original packet (not shown) that which a tunnel packet (e.g., security payload (458)) encapsulates and the security packet (450) encrypts. Meanwhile, the destination MAC address may represent a unique data-link layer identifier assigned to, or associated with, a destination host—i.e., the host to which the original packet, that which the tunnel packet encapsulates and the security packet (450) encrypts, may be directed or addressed.

In one embodiment, the security L3 header (454) may collectively encompass various information required for network layer routing of the security packet (450) through a network. Specifically, the security L3 header (454) may include, but is not limited to, a security origination IP address (468) and a security termination IP address (470). The security origination IP address (468) may represent a unique network layer identifier assigned to, or associated with, a security origination end point. A security origination end point may refer to a VODE (described above) responsible for encrypting a tunnel packet, to thereby generate the security packet (450). Alternatively, the security origination end point may refer to the physical computing system (e.g., network device) whereon the aforementioned VODE may be executing. Meanwhile, the security termination IP address (470) may represent a unique network layer identifier assigned to, or associated with, a security termination end point. A security termination end point may refer to a VODE (described above) responsible for decrypting the security packet (450), to thereby obtain a tunnel packet enclosed therein. Alternatively, the security termination end point may refer to the physical computing system (e.g., network device) whereon the aforementioned VODE may be executing.

In one embodiment, the security header (456) may collectively encompass various information (or metadata) descriptive of, and/or pertinent to, the overlay domain tunnels used by the security packet (450). Specifically, the security header (456) may include, but is not limited to, a security parameter index (SPI) (472). The SPI (472) may refer to a fixed-length identification tag, which may, at least in part, uniquely identify a Security Association (SA) to which the security packet (450) may be bound. The SA may refer to a set of established, shared security attributes between two network entities (e.g., hosts, network devices, etc.) that support secure communication. Further, the SA may include attributes such as, for example, the cryptographic algorithm used to encrypt and/or decrypt content, the security mode (e.g., an IPsec tunnel mode or an IPsec transport mode) in which the employed security protocol (e.g., VPN protocol) may operate, the key generation algorithm used to generate the public and/or private encryption keys employed by the cryptographic algorithm, and other parameters pertinent to the security, authentication, and/or transport of the security packet (450) using the secure overlay domain tunnels.

In one embodiment, the security payload (458) may refer to the content (or data) that may be encrypted and transported across networks using secure overlay domain tunneling. More specifically, the security payload (458) may substantively encompass a tunnel packet (see e.g., FIG. 4B), which may include information that a source host may be attempting to transmit to a destination host. Accordingly, the security payload (458) may include, but is not limited to, a tunnel L3 header (434), a tunnel header (436), and a tunnel payload (438) (described above).

In one embodiment, the security trailer (460) may collectively encompass various information directed to padding and the formatting of the security payload (458). With respect to padding, the security trailer (460) may specify one or more data fields (not shown), which may be used to ensure that the cipher-text resulting from encrypting the encrypted payload (464) terminates on a prescribed bit or byte alignment. Meanwhile, with respect to the formatting of the security payload (458), the security trailer (460) may specify one or more data fields (not shown), which indicate a prescribed numerical value mapped to a given protocol data unit (PDU) format with which the security payload (458) may be associated. Examples of PDU formats may include, but are not limited to, PDU formats employed in the transmission control protocol (TCP), the IP, the user datagram protocol (UDP), the hypertext transfer protocol (HTTP), and any other network protocol directed to the data-link layer (L2), the network layer (L3), the transport layer (L4), the session layer (L5), the presentation layer (L6), and/or the application layer (L7).

In one embodiment, the security authentication (462) may collectively encompass various information directed to authenticating the security packet (450). That is, the security authentication (462) may include, but is not limited to, an integrity check value (ICV) and a message authentication code. The ICV, like a checksum, may refer to a digest derived from hashing at least a portion of the security packet (450) (e.g., the authenticated payload (466)), which may be used for the purpose of detecting data integrity breaches (i.e., errors that may have been introduced through transmission, storage, or tampering). On the other hand, the message authentication code may refer to a tag that may be used to authenticate (or verify) an identity of the security packet (450) sender (e.g., security origination end point (described above)).

Figure 5A:
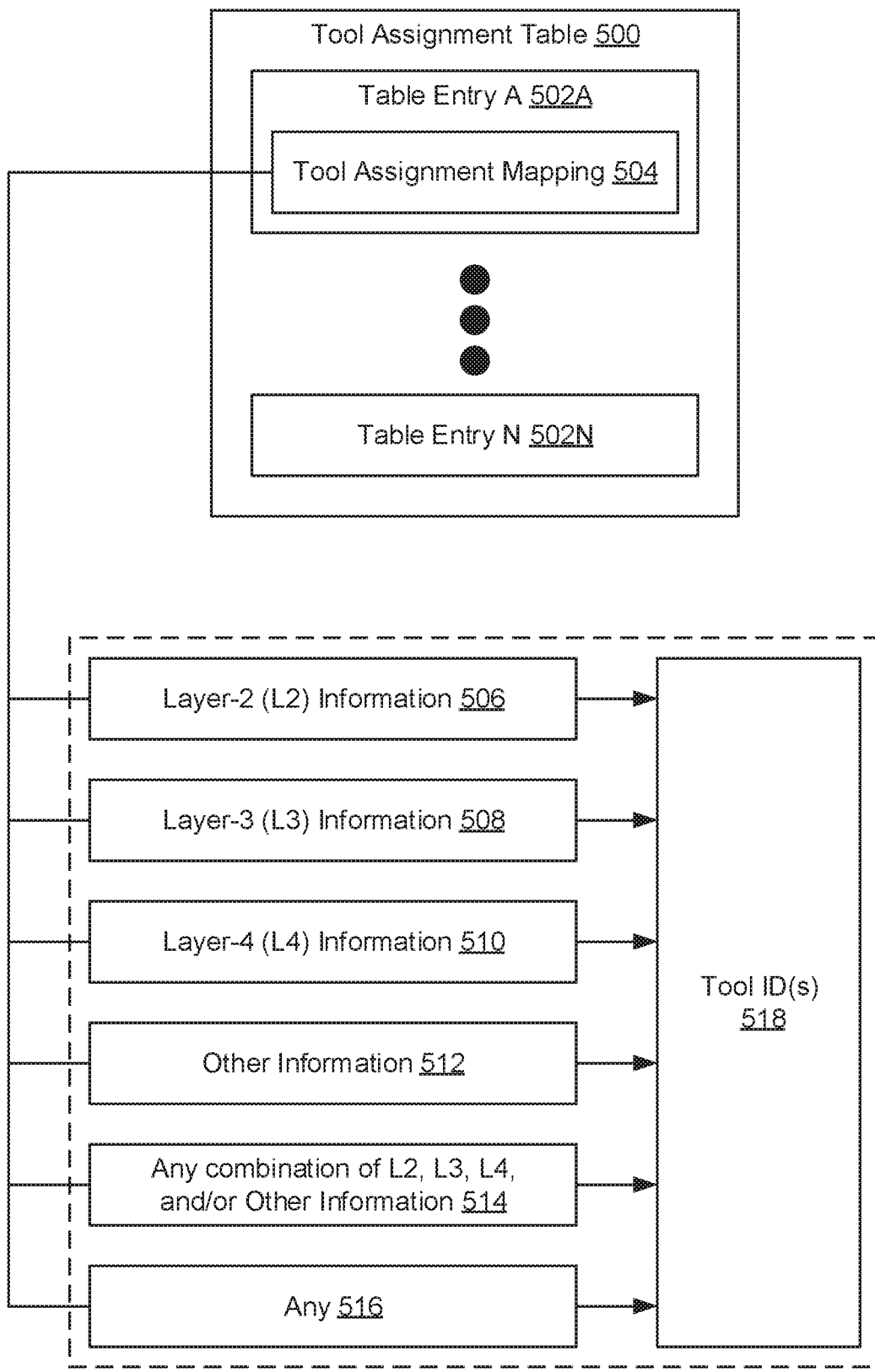
FIG. 5A shows a tool assignment table in accordance with one or more embodiments.

FIG. 5A shows a tool assignment table in accordance with one or more embodiments. The tool assignment table (500) may represent a data object or data structure dedicated to storing tool assignment mappings (504). The tool assignment table (500) may reside in the memory of an edge-spine network device (see e.g., FIGS. 2A and 2B), an edge network device (see e.g., FIGS. 3A and 3B), and/or a spine network device (see e.g., FIGS. 3A and 3B). By way of an example, the tool assignment table (500) may be implemented using ternary content addressable memory (TCAM).

Furthermore, in one embodiment, each tool assignment mapping (504) may be tracked in the form of a table entry (502A-502N), and may pertain to binding certain network traffic attributes to tools configured for analyzing the network traffic. Accordingly, each tool assignment mapping (504) may associate, with one or more tool identifiers (518): layer-2 (L2) information (506); layer-3 (L3) information (508); layer-4 (L4) information (510); other information (512); any combination of L2, L3, L4, and/or other information (514) (also referred to hereinafter as combination information); and all of the above-mentioned information (516) (also referred to hereinafter as wildcard information). Hereinafter, any of the aforementioned network traffic attributes (506-516) may also be referred to as a tool assignment mapping key for any given tool assignment mapping (504), whereas the corresponding tool identifier (518) may also be referred to as a tool assignment mapping value for the given tool assignment mapping (504). Each of these tool assignment mapping (504) keys and values are described below.

In one embodiment, L2 information (506) may refer to data-link layer information (or metadata) descriptive of a network traffic flow. Data-link layer information may be directed to the local forwarding of protocol data units (PDUs) (e.g., data packets), forming the network traffic flow, between multiple interconnected devices within a local area network (LAN) or a subnet (i.e., subnetwork) of a wide area network (WAN) such as the Internet. Further, the L2 information (506) may or may not be specified within header information of the aforementioned PDU(s) (e.g., original packets; see e.g., FIG. 4A). Examples of L2 information (506) may include, but are not limited to, a source MAC address associated with an origination end point (e.g., source host) of the network traffic flow, and a destination MAC address associated with a termination end point (e.g., destination host) of the network traffic flow.

In one embodiment, L3 information (508) may refer to network layer information (or metadata) descriptive of a network traffic flow. Network layer information may be directed to the inter-network routing of PDUs, forming the network traffic flow, between multiple interconnected LANs or subnets of a WAN such as the Internet. Further, the L3 information (508) may or may not be specified within header information of the aforementioned PDU(s). Examples of L3 information (508) may include, but are not limited to, a source IP address associated with an origination end point of the network traffic flow, a destination IP address associated with a termination end point of the network traffic flow, a source virtual routing and forwarding (VRF) domain associated with the origination end point of the network traffic flow, and a destination VRF domain associated with the termination end point of the network traffic flow.

In one embodiment, L4 information (510) may refer to transport layer information (or metadata) descriptive of a network traffic flow. Transport layer information may be directed to the delivery of PDUs, forming the network traffic flow, between appropriate applications hosted on interconnected devices (e.g., hosts) throughout a network (e.g., one or more LANs, one or more subnets of a WAN such as the Internet, etc.). Further, the L4 information (510) may or may not be specified within header information of the aforementioned PDU(s). Examples of L4 information (510) may include, but are not limited to, a source network interface (or port) used by an appropriate application executing on an origination end point of the network traffic flow, a destination network interface (or port) used by an appropriate application executing on a termination end point of the network traffic flow, and a byte-length descriptive of a length of the PDU(s) forming the network traffic flow.

In one embodiment, other information (512) may refer to miscellaneous information (or metadata) descriptive of a network traffic flow. Miscellaneous information may be directed to any information not specifically recognized as L2 information (506), L3 information (508), and/or L4 information (510). Further, the other information (512) may or may not be specified within header information of one or more PDUs, which may form the network traffic flow. Examples of other information (512) may include, but are not limited to, a source virtual local area network (VLAN) tag for a source VLAN associated with an origination end point of the network traffic flow, a destination VLAN tag for a destination VLAN associated with a termination end point of the network traffic flow, a type of service (or service precedence) associated with the network traffic flow, and a protocol used in the encapsulation of the data payload (e.g., original payload; see e.g., FIG. 4A) of the PDU(s) forming the network traffic flow.

In one embodiment, combination information (514) may refer to any arrangement of L2 information (506), L3 information (508), L4 information (510), and/or other information (512) (or metadata) descriptive of a network traffic flow. Combination information (514) may entail multiple data items pertaining to a single information class—e.g., multiple data items classified as L2 information (506). Alternatively, combination information (514) may entail multiple data items spanned across multiple information classes—e.g., a first data item classified as L2 information (506), second and third data items classified as L3 information (508), as well as a fourth data item classified as other information (512).

In one embodiment, wildcard information (516) may refer to a superset of information that encompasses any and all of the previous information sets—i.e., L2 information (506), L3 information (508), L4 information (510), other information (512), and combination information (514). Further, wildcard information (516) may be used to identify any and all network traffic flows, which would entail configuring network devices to identify any and all traversing network traffic as requiring deep network traffic inspecting and/or processing.

In one embodiment, a tool identifier (ID) (518) may represent any arbitrary-length character string (e.g., including any arrangement of one or more letters, numbers, and/or non-reserved symbols) that uniquely identifies (or names) a tool. A tool may represent a physical or virtual computing system (e.g., implemented through software and/or computer hardware) that may be configured to analyze network traffic by way of deep packet inspection (DPI) and packet processing. The analysis of network traffic may be directed to, for example, network performance monitoring, troubleshooting, capacity planning, and intrusion detection and/or prevention.

Figure 5B:
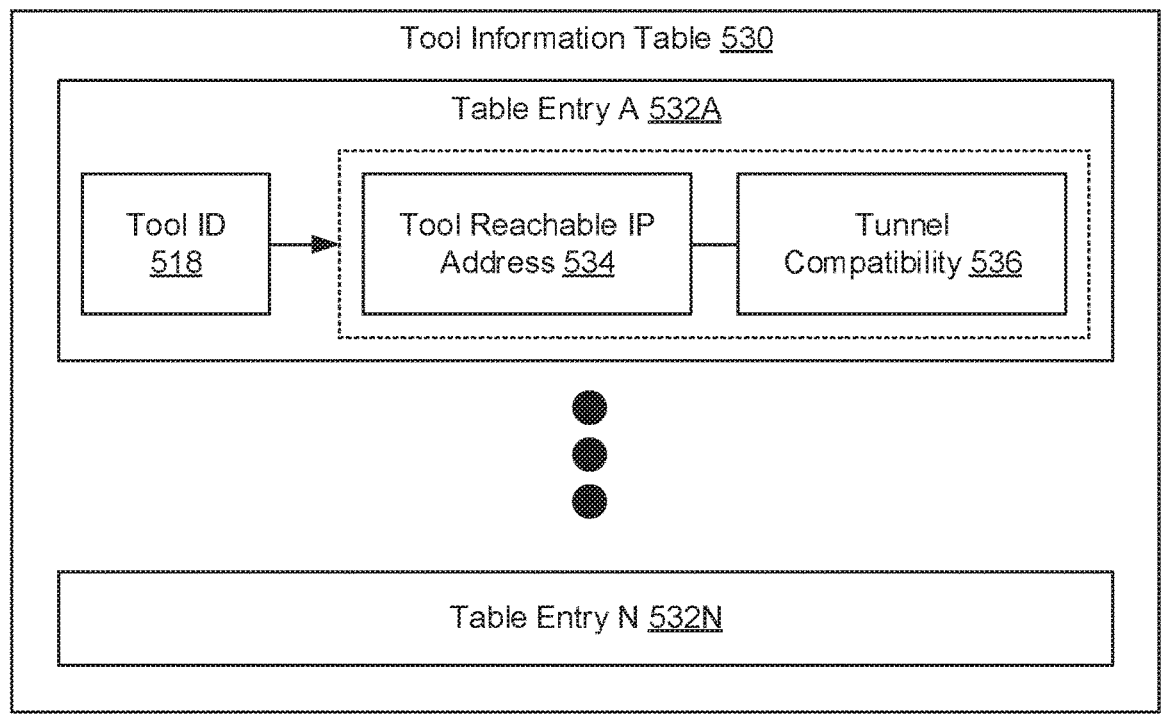
FIG. 5B shows a tool information table in accordance with one or more embodiments.

FIG. 5B shows a tool information table in accordance with one or more embodiments. The tool information table (530) may represent a data object or data structure dedicated to maintaining information pertinent to tools residing in various datacenters (e.g., TCD (see e.g., FIGS. 2A and 2B) and TID (see e.g., FIGS. 3A and 3B)). A tool may represent a physical or virtual computing system (e.g., implemented through software and/or computer hardware) that may be configured to analyze network traffic by way of deep packet inspection (DPI) and packet processing. Further, the tool information table (530) may include a table entry (532A-532N) for each tool residing across the various datacenters. Specifically, any given table entry (532A-532N) may include a mapping associating a tool identifier (ID) (518) to a tuple of tool pertinent information, which may include a tool-reachable network (e.g., IP) address (TRIP) (534) and a tunnel compatibility (TC) (536). Each of these data items is described below.

In one embodiment, the tool ID (518) may represent any arbitrary-length character string (e.g., including any arrangement of one or more letters, numbers, and/or non-reserved symbols) that uniquely identifies (or names) a tool. Further, the tool ID (518) may serve as an index that maps the table entry (532A-532N) to one or more tool assignment table entries (see e.g., FIG. 5A).

In one embodiment, the TRIP (534) may refer to a network address, either affiliated with a component residing in a local datacenter or a remote datacenter, where-behind the tool, associated with the tool ID (518), may reside. Should the TRIP pertain to a local datacenter network address, the network address may be associated with a TAP aggregation device (see e.g., FIGS. 3A and 3B), which may be directly-connected to the aforementioned tool. Alternatively, should the TRIP (534) pertain to a remote datacenter (e.g., TCD) (see e.g., FIGS. 2A and 2B)) network address, the network address may be associated with a loopback network interface configured on an edge-spine network device, edge network device, and/or spine network device residing in the remote datacenter. The loopback network interface may represent a virtual or logical (i.e., software-defined) network interface, which may be reachable through a physical network interface of the aforementioned edge-spine, edge, and/or spine network device(s). Further, in the latter case, the network address associated with the loopback network interface may also be referred to as the loopback network (e.g., IP) address for tunnel stripping. That is, the network address may pertain to a loopback network interface, which may be configured on a remote datacenter component whereon the decapsulation of tunnel packets (see e.g., FIG. 4B) may transpire if warranted based on the TC (536) (described below).

In one embodiment, the TC (536) may represent a variable or a value that serves as an indicator for the tunnel packet compatibility of the above-mentioned tool associated with the retrieved tool ID (518). Tunnel packet compatibility may be expressed in one of two states, which include: (a) a compatible state, indicating that the tool is capable of processing tunnel packets; and (b) an incompatible state, alternatively indicating that the tool is incapable of processing tunnel packets. In the latter case, prior to delivery of the network traffic (e.g., tunnel packet) to the tool, the tunnel packet (see e.g., FIG. 4B) may be decapsulated, to obtain the original packet (see e.g., FIG. 4A) enclosed therein, which may subsequently be provided to the tool for processing. Furthermore, the TC (536) may be implemented using, for example, a binary value (e.g., a logical one or logical zero), a Boolean value (e.g., a true or false), a categorical value (e.g., a "compatible" or "incompatible"), or a numerical value (e.g., a numerical one or numerical zero).

Figure 5C:
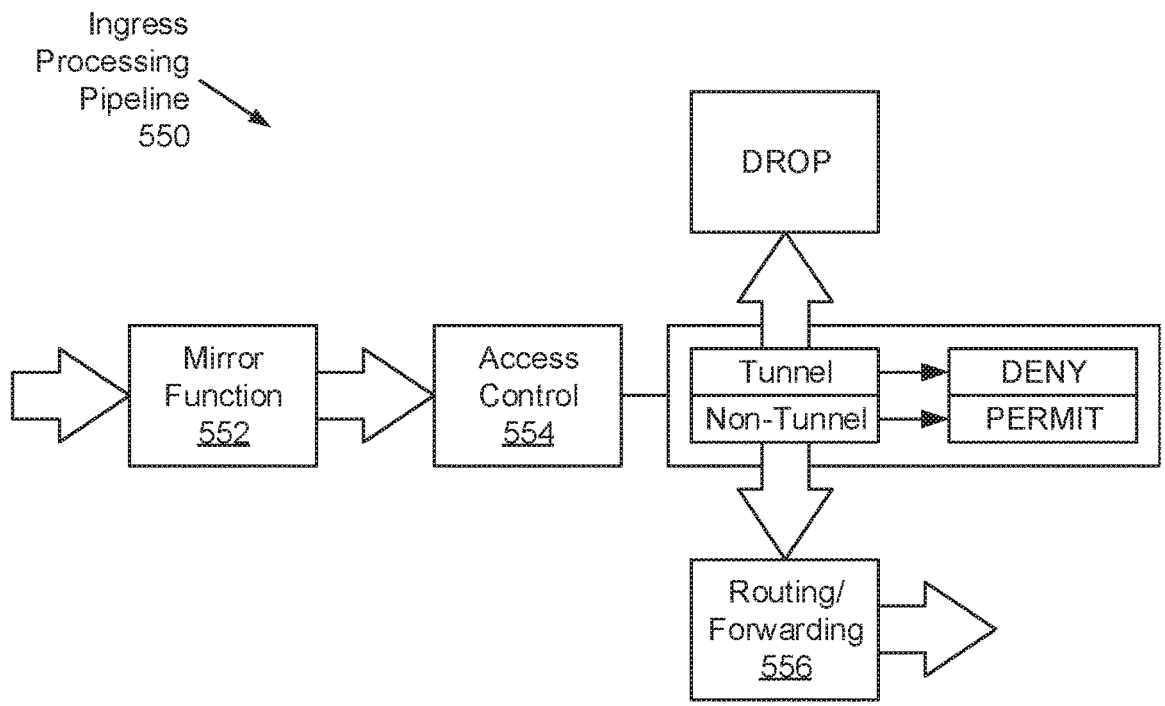
FIG. 5C shows an ingress processing pipeline in accordance with one or more embodiments.

FIG. 5C shows an ingress processing pipeline in accordance with one or more embodiments. Generally, an ingress processing pipeline (550) may refer to a set of successive data processing elements (or stages), on a network device, that collectively process and determine where to forward network traffic (e.g., data packets). The aforementioned network device, whereon the ingress processing pipeline (550) may reside, may refer to an edge-spine network device, an edge network device, or a spine network device that resides in a TCD (see e.g., FIGS. 2A and 2B). Further, the set of data processing elements may access and utilize various data structures, policies, rules, and/or other information to achieve the aforementioned directive. Also, the ingress processing pipeline (550) may be responsible for the processing of a subset of the total network traffic that may be received by the network device. Specifically, the subset of network traffic may reference network traffic that may arrive through a given physical network interface (or port) of the network device. More specifically, the data processing elements, of the presented ingress processing pipeline (550), may affect any network traffic received at the physical network interface, of the network device, behind which a loopback network interface (for tunnel stripping) (described above) (see e.g., FIG. 5B) may be configured.

In one embodiment, the data processing elements of the ingress processing pipeline (550) may include, but are not limited to, a mirror function (552), followed by an access control (554) stage, which may be followed by a routing and/or forwarding (556) stage. With respect to the processing of network traffic, the mirror function (552) may enable a network device to: replicate the network traffic to obtain one or more network traffic copies; and, subsequently, direct the network traffic copy(ies) to one or more external analyzers (e.g., tools) for deep network traffic inspection and/or processing. Regarding the processing of network traffic, the access control (554) stage may enable the network device to: filter the network traffic based on a collection of permit and deny conditions (or rules) (described below). Lastly, if reached, the routing and/or forwarding (556) stage may enable the network device to: determine out of which physical network interface, of the network device, to send the network traffic based on at least a portion of header information included in the network traffic, one or more policies, or any other decision mechanism; and, accordingly, transmit the network traffic to a next hop or destination operatively connected to the network device through the determined physical network interface.

In one embodiment, the ingress processing pipeline (550) captures an access control (554) modification pertinent to embodiments of the technology. Specifically, the access control (554) stage may be configured to filter network traffic based on the following logic: (a) if the network traffic encompasses data packets identified as tunnel packets (see e.g., FIG. 4B), then deny the network traffic access to the routing and/or forwarding (556) stage—e.g., drop or discard the network traffic; or (b) if the network traffic encompasses data packets not identified as tunnel packets (e.g., original packets (see e.g., FIG. 4A), security packets (see e.g., FIG. 4C), etc.), then permit the network traffic access to the routing and/or forwarding (556) stage. Summarily, the above-defined access control (554) configuration is employed to ensure the packet mirroring of any network traffic, which may arrive at the physical network interface behind which the loopback network interface (for tunnel stripping) is configured on the network device, while preventing the routing and/or forwarding (556) of received tunnel packets. In preventing the latter event from transpiring, network traffic loops entailing tunnel packets, which may arrive back at the loopback network interface of the network device following their retrieval from decrypted security packets, may be avoided.

Figure 6A:
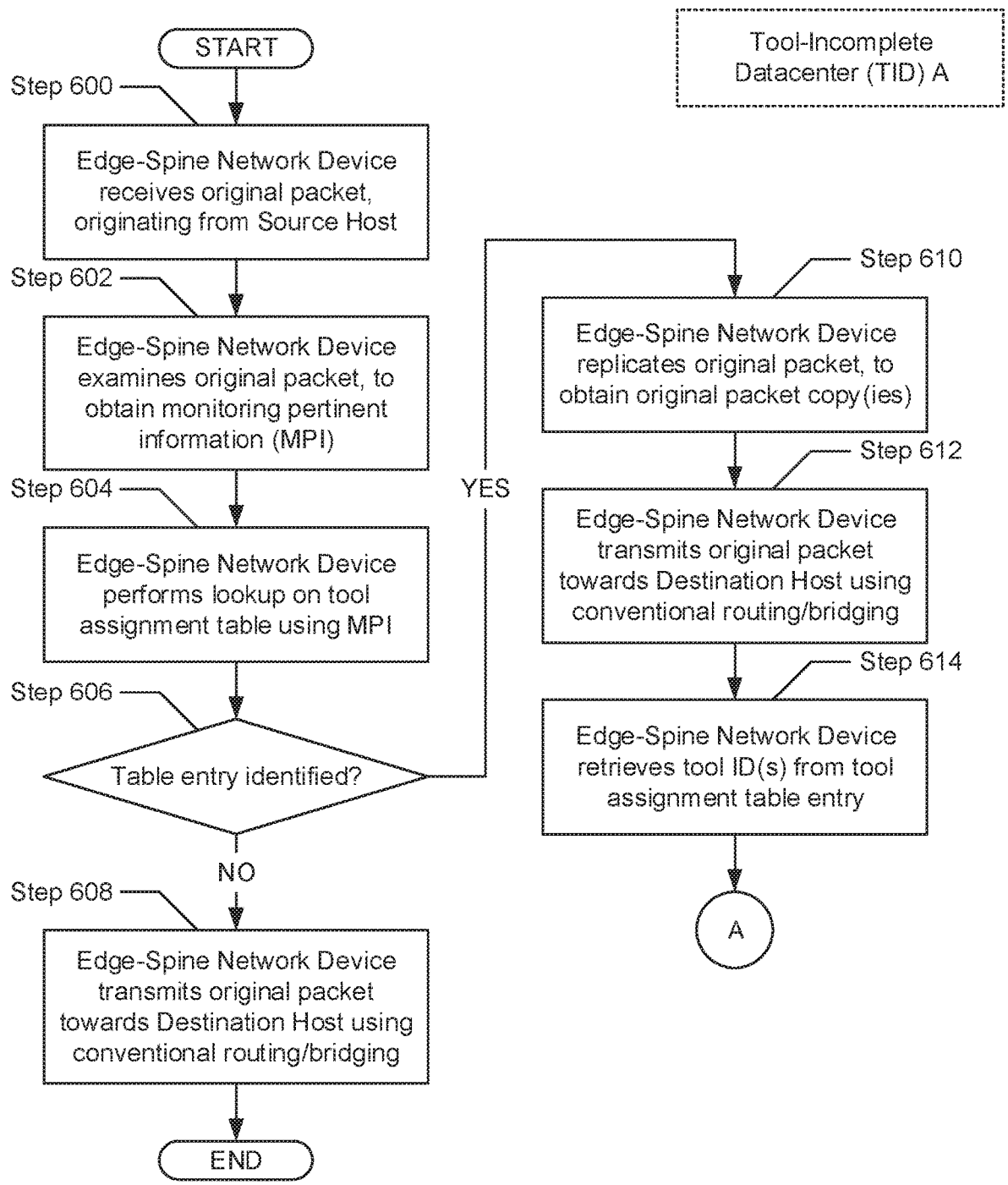
FIGS. 6A-6C show flowcharts describing a method for processing original packets in accordance with one or more embodiments.
Figure 6B:
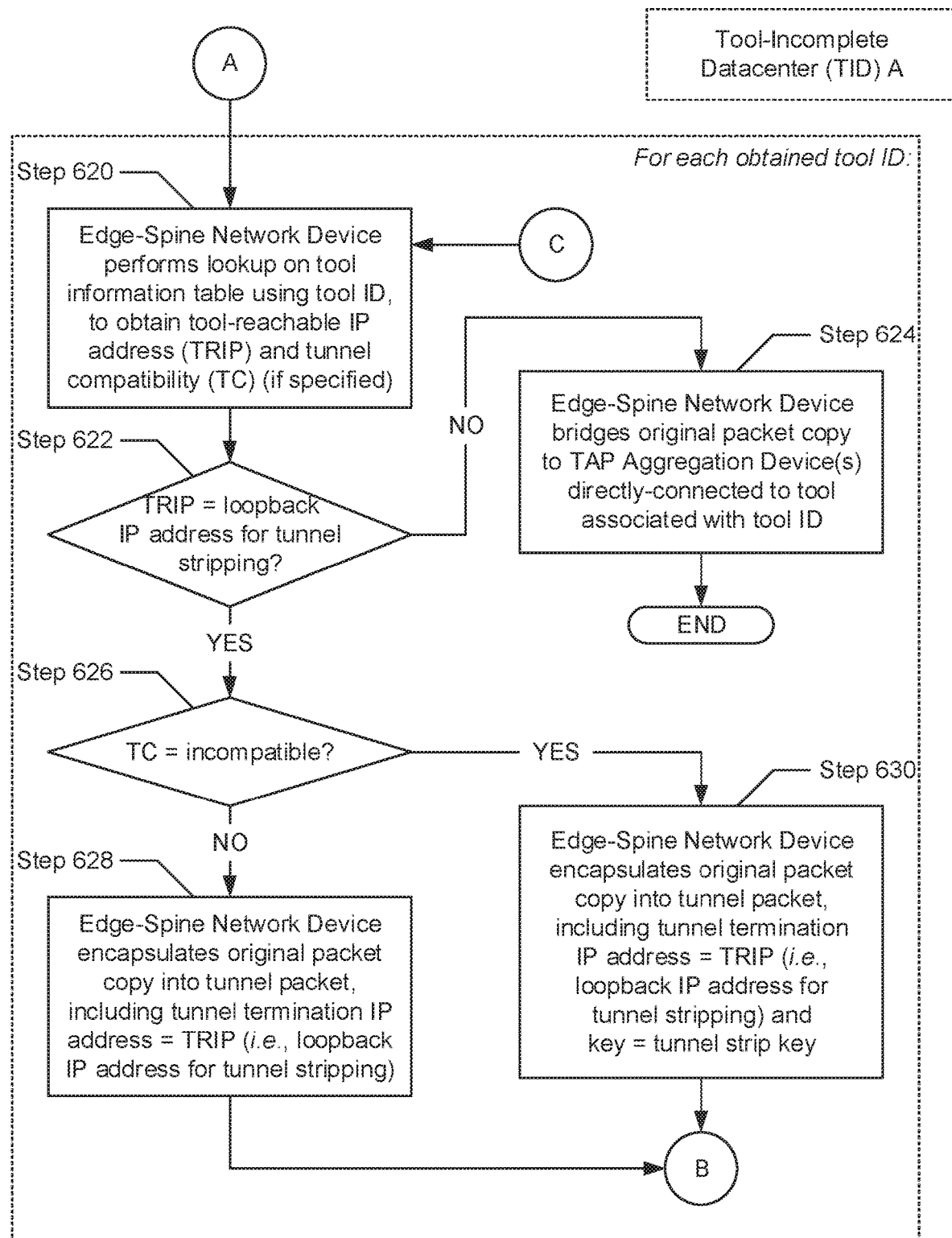
Figure 6C:
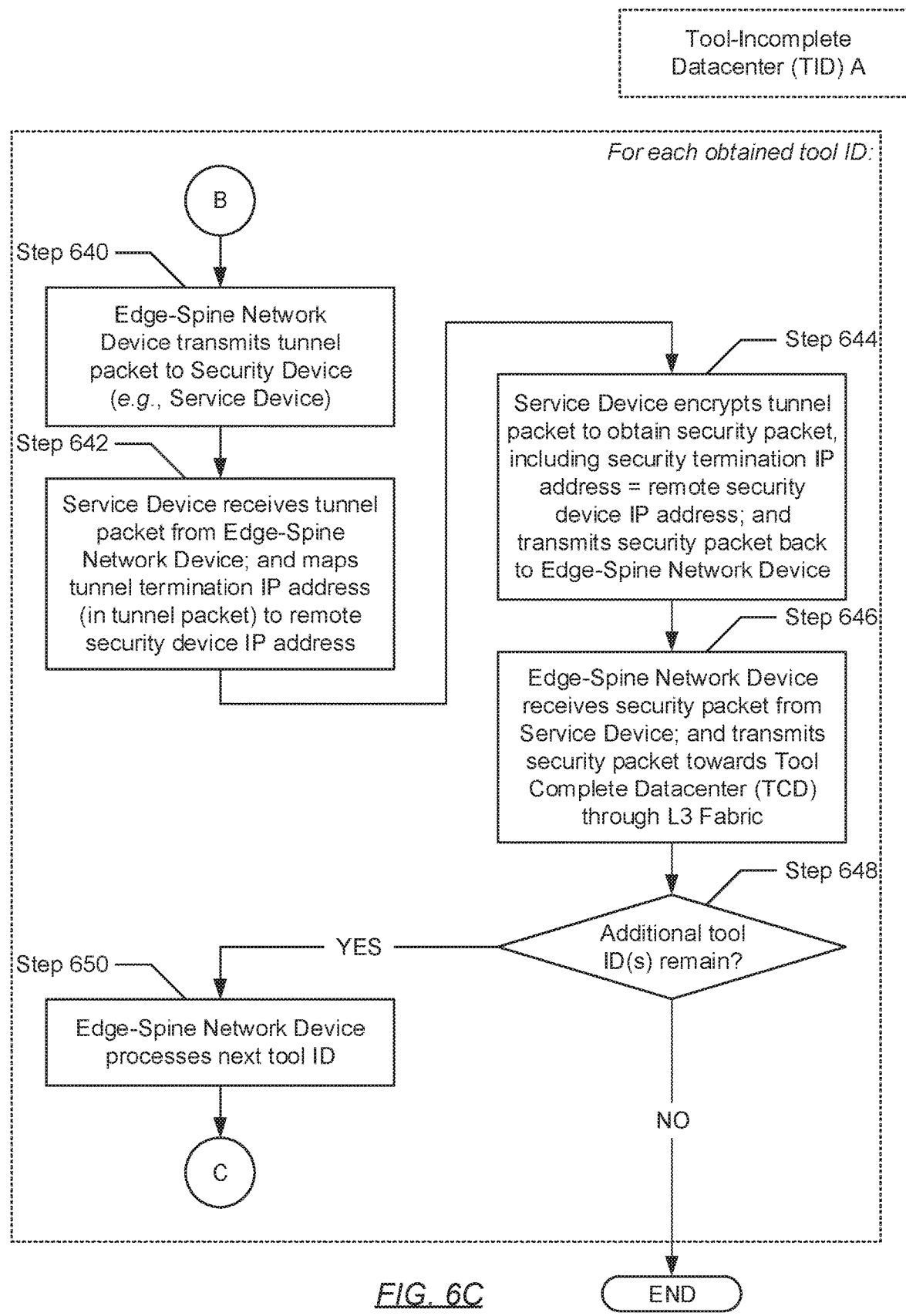

FIGS. 6A-6C show flowcharts describing a method for processing original packets in accordance with one or more embodiments. The various steps outlined below may be performed by various components of a TID (see e.g., FIG. 3A). Further, while the various steps in the flowchart(s) are presented and described sequentially, one of ordinary skill will appreciate that some or all steps may be executed in different orders, may be combined or omitted, and some or all steps may be executed in parallel.

Turning to FIG. 6A, in Step 600, an edge-spine network device (see e.g., FIG. 3A) receives an original packet (see e.g., FIG. 4A). In one embodiment, the received original packet may have originated from (i.e., may have been generated by) a source host, which may be directly-connected to a leaf network device operatively connected to the edge-spine network device.

In Step 602, the edge-spine network device examines the original packet (received in Step 600). In one embodiment, examination of the received original packet may yield monitoring pertinent information (MPI). MPI may refer to one or more attributes (or metadata) that may be descriptive of a given network traffic flow (i.e., a unique sequence of one or more data packets communicated from a source host to a destination host). The attribute(s) may represent criteria for identifying the given network traffic flow—the data packet(s) of which may be sought for deep packet inspection and/or processing. Further, at least a portion of the MPI may be extracted from header information (e.g., L2 header information, L3 header information, and/or L4 header information) embedded in the received original packet and, accordingly, the aforementioned examination may entail at least parsing the received original packet header information.

In Step 604, the edge-spine network device performs a lookup on a tool assignment table (see e.g., FIG. 5A) using the MPI (obtained in Step 602). In one embodiment, the lookup may entail performing a sequential or concurrent (i.e., parallel) entry-by-entry comparison between the MPI and a respective tool assignment mapping key in each table entry of the tool assignment table.

In Step 606, a determination is made as to whether a table entry, of the tool assignment table, is identified as a result of the lookup (performed in Step 604). The determination may rely on whether a table entry includes a tool assignment mapping key that matches at least a portion of the MPI (obtained in Step 602). Accordingly, in one embodiment, if it is determined that at least a portion of the MPI matches the tool assignment mapping key specified in a table entry of the tool assignment table, then a table entry has been identified and the process may proceed to Step 610. On the other hand, in another embodiment, if it is alternatively determined that no portion of the MPI matches the tool assignment mapping key specified in any table entry of the tool assignment table, then no table entry has been identified and the process may alternatively proceed to Step 608.

In Step 608, upon determining (in Step 606) that the tool assignment table lacks at least a table entry that includes a tool assignment mapping key matching at least a portion of the MPI (obtained in Step 604), the edge-spine network device transmits the original packet (received in Step 600) towards a destination host. In one embodiment, the destination host may represent a local or remote host for which the original payload (see e.g., FIG. 4A), in the original packet, may be intended. Further, the transmission may entail conventional network traffic forwarding. That is, in one embodiment, if the destination host is a local host, the transmission of the original packet to the destination host may be facilitated through data-link layer or L2 bridging. In another embodiment, if the destination host is a remote host, the transmission of the original packet to the destination host may alternatively be facilitated through network layer or L3 routing.

In Step 610, upon alternatively determining (in Step 606) that the tool assignment table includes a table entry that includes a tool assignment mapping key matching at least a portion of the MPI (obtained in Step 604), the edge-spine network device replicates the original packet (received in Step 600). In one embodiment, replication of the original packet may yield one or more original packet copies.

In Step 612, the edge-spine network device transmits the original packet (received in Step 600) towards a destination host. In one embodiment, the destination host may represent a local or remote host for which the original payload (see e.g., FIG. 4A), in the original packet, may be intended. Further, the transmission may entail conventional network traffic forwarding. That is, in one embodiment, if the destination host is a local host, the transmission of the original packet to the destination host may be facilitated through data-link layer or L2 bridging. In another embodiment, if the destination host is a remote host, the transmission of the original packet to the destination host may alternatively be facilitated through network layer or L3 routing.

In Step 614, the edge-spine network device retrieves one or more tool identifiers (IDs) from the table entry of the tool assignment table (identified through the determination in Step 606). Specifically, in one embodiment, a tool assignment mapping value, specified in the identified table entry, may be obtained, where the tool assignment mapping value includes the tool ID(s) associated with one or more tools. Further, the tool(s) may represent a physical or virtual computing system (e.g., implemented through software and/or computer hardware) that may be configured to analyze network traffic by way of deep packet inspection (DPI) and packet processing. Hereafter, following the retrieval of one or more tool IDs, the process may proceed to Step 620 (see e.g., FIG. 6B).

Turning to FIG. 6B, hereinafter, Steps 620 through 650 are to be performed for each tool ID (retrieved in Step 614 (see e.g., FIG. 6A)). With the aforementioned in mind, in Step 620, the edge-spine network device performs a lookup on a tool information table (see e.g., FIG. 5B) using the tool ID (i.e., the tool ID currently being processed). In one embodiment, the lookup may entail performing a sequential or concurrent (i.e., parallel) entry-by-entry comparison between the retrieved tool ID and a stored tool ID specified in each table entry of the tool information table. Further, upon matching the retrieved tool ID to the stored tool ID of one of the tool information table entries, a tool-reachable network (e.g., IP) address (TRIP) and a tunnel compatibility (TC) (if specified) is/are obtained.

In one embodiment, the TRIP may refer to a network address, either affiliated with a component residing in the local datacenter or a remote datacenter, where-behind the tool, associated with the retrieved tool ID, may reside. Should the TRIP pertain to a local datacenter network address, the network address may be associated with a TAP aggregation device (see e.g., FIG. 3A), which may be directly-connected to the aforementioned tool. Alternatively, should the TRIP pertain to a remote datacenter (e.g., TCD (see e.g., FIGS. 2A and 2B)) network address, the network address may be associated with a loopback network interface configured on an edge-spine network device, edge network device, and/or spine network device residing in the remote datacenter. The loopback network interface may represent a virtual or logical (i.e., software-defined) network interface, which may be reachable through a physical network interface of the aforementioned edge-spine, edge, and/or spine network device(s). Further, in the latter case, the network address associated with the loopback network interface may also be referred to as the loopback network (e.g., IP) address for tunnel stripping. That is, the network address may pertain to a loopback network interface, which may be configured on a remote datacenter component whereon the decapsulation of received tunnel packets (see e.g., FIG. 4B) may transpire if warranted based on the TC (described below).

In one embodiment, the TC may represent a variable or a value that serves as an indicator for the tunnel packet compatibility of the above-mentioned tool associated with the retrieved tool ID. Tunnel packet compatibility may be expressed in one of two states, which include: (a) a compatible state, indicating that the tool is capable of processing tunnel packets; and (b) an incompatible state, alternatively indicating that the tool is incapable of processing tunnel packets. In the latter case, prior to delivery of the network traffic (e.g., tunnel packet) to the tool, the tunnel packet (see e.g., FIG. 4B) may be decapsulated, to obtain the original packet (see e.g., FIG. 4A) enclosed therein, which may subsequently be provided to the tool for processing. Furthermore, the TC may be implemented using, for example, a binary value (e.g., a logical one or logical zero), a Boolean value (e.g., a true or false), a categorical value (e.g., a "compatible" or "incompatible"), or a numerical value (e.g., a numerical one or numerical zero).

In Step 622, a determination is made as to whether the TRIP (obtained in Step 620) matches a loopback network (e.g., IP) address for tunnel packet stripping (described above). In one embodiment, if it is determined that the TRIP matches the loopback network address for tunnel packet stripping, then the tool (associated with the retrieved tool ID currently being processed) resides on a remote datacenter and the process may proceed to Step 626. On the other hand, in another embodiment, if it is alternatively determined that the TRIP mismatches the loopback network address for tunnel packet stripping, then the tool resides in the local datacenter and the process may alternatively proceed to Step 624.

In Step 624, upon determining (in Step 622) that the TRIP (obtained in Step 620) mismatches the loopback network address for tunnel stripping (described above), the edge-spine network device bridges an original packet copy (obtained in Step 610) to an appropriate TAP aggregation device residing in the local datacenter. In one embodiment, the TAP aggregation device may be assigned to, or associated with, the aforementioned, obtained TRIP. Further, the tool, associated with the retrieved tool ID currently being processed, may reside behind and, thus, may be directly-connected to the appropriate TAP aggregation device. Thereafter, the TAP aggregation device may provide the original packet copy to the directly-connected tool for deeper network traffic inspection and/or processing.

In Step 626, upon alternatively determining (in Step 622) that the TRIP (obtained in Step 620) matches the loopback network address for tunnel stripping (described above), another determination is made as to whether the TC (also obtained in Step 620) reflects an incompatible state. In one embodiment, if it is determined that the TC reflects the incompatible state, then the tool—performing the inspection and processing of the network traffic—is incapable of handling tunnel packets and the process may proceed to Step 630. On the other hand, in another embodiment, if it is alternatively determined that the TC reflects a compatible state, then the tool is capable of handling tunnel packets and the process may alternatively proceed to Step 628.

In Step 628, upon determining (in Step 626) that the TC reflects the compatible state (described above), the edge-spine network device encapsulates an original packet copy (obtained in Step 610) into a tunnel packet (see e.g., FIG. 4B). In one embodiment, encapsulation of the original packet copy, thereby producing the tunnel packet, may entail appending additional header information—e.g., a tunnel header, a tunnel L3 header, and a tunnel L2 header—to the original data packet copy (see e.g., FIG. 4A), which may represent the tunnel payload. Furthermore, the tunnel packet may include a tunnel termination network (e.g., IP) address. The tunnel termination network address may refer to a network address assigned to, or associated with, a termination end point of the network protocol forwarding the tunnel packet through a network. That is, the tunnel packet termination end point may refer to a physical computing system whereon decapsulation (i.e., removal of the additionally appended header information) of the tunnel packet may transpire. Moreover, the tunnel termination network address may be set as the TRIP (i.e., the loopback network address for tunnel stripping) (obtained in Step 620). Hereinafter, following the encapsulation of the original packet copy into the tunnel packet, the process may proceed to Step 640 (see e.g., FIG. 6C).

In Step 630, upon alternatively determining (in Step 626) that the TC reflects the incompatible state (described above), the edge-spine network device encapsulates an original packet copy (obtained in Step 610) into a tunnel packet (see e.g., FIG. 4B). In one embodiment, encapsulation of the original packet copy, thereby producing the tunnel packet, may entail appending additional header information—e.g., a tunnel header, a tunnel L3 header, and a tunnel L2 header—to the original data packet copy (see e.g., FIG. 4A), which may represent the tunnel payload. Furthermore, the tunnel packet may include a tunnel termination network (e.g., IP) address (described above) and a key (see e.g., FIG. 4B). The key (also referred to as the tunnel key) may refer to a data field, of the tunnel header, which may be used to carry over context information, not present in the encapsulated data, that provides context at least with respect to the processing of the tunnel packet. In one embodiment, the enclosed context information may take form as a tunnel strip key representative of the TC (i.e., reflecting the incompatible state) (obtained in Step 620). Hereinafter, following the encapsulation of the original packet copy into the tunnel packet, the process may proceed to Step 640 (see e.g., FIG. 6C).

Turning to FIG. 6C, in Step 640, the edge-spine network device transmits the tunnel packet (obtained in Step 628 or Step 630) to a security device. More specifically, in one embodiment, the security device (also referred to as a service device) may be a virtual private network (VPN) device, which may include functionality to encrypt and decrypt network traffic for secure transmission across a network. Further, transmission of the tunnel packet to the service device may entail network traffic bridging (i.e., data-link layer or L2 forwarding), network traffic routing (i.e., network layer or L3 forwarding), or a combination thereof.

In Step 642, the above-mentioned service (or security) device receives the tunnel packet from the edge-spine network device. Upon receiving the tunnel packet, in one embodiment, the service device may examine the header information (see e.g., FIG. 4B) of the tunnel packet, to identify the tunnel termination network (e.g., IP) address specified therein. Recall, from Step 628 or Step 630, that the tunnel termination network address had been set to the TRIP (i.e., loopback network address for tunnel stripping) (obtained in Step 620). Subsequently, the service device may map the identified tunnel termination network address to a remote service (or security) device network address, where the remote service device network address may be assigned to, or associated with, another VPN device that may reside on a remote datacenter.

In Step 644, the service device encrypts the tunnel packet (received in Step 642) to obtain a security packet (see e.g., FIG. 4C). In one embodiment, encryption of the tunnel packet, thereby producing the security packet, may entail: protecting a security payload, including a substantive portion of the tunnel packet, using IP security (IPsec) encryption and authentication protocols—e.g., the encapsulating security payload (ESP) and authentication header (AH) protocols; and appending additional header and trailer information—e.g., a security header, a security L3 header, a security L2 header, a security trailer, and a security authentication—to the security payload. Furthermore, the security packet may include a security termination network (e.g., IP) address. The security termination network address may refer to a network address assigned to, or associated with, a termination end point of the network protocol forwarding the security packet through a network. That is, the security packet termination end point may refer to a physical computing system whereon decryption of the security packet may transpire. Moreover, the security termination network address may be set as the remote security device network address (identified in Step 642).

In Step 646, the edge-spine network device receives the security packet from the service device. Upon receiving the security packet, in one embodiment, the edge-spine network device may examine the header information (see e.g., FIG. 4C) of the security packet, to identify the security termination network (e.g., IP) address specified therein. Recall, from Step 644, that the security termination network address has been set to the remote service (or security) device network address (identified in Step 642). Subsequently, based on at least the security termination network address, the edge-spine network device transmits (i.e., routes) the security packet towards the remote datacenter (e.g., a TCD) wherein the tool, associated with the tool ID currently being processed, may reside.

In Step 648, a determination is made as to whether any additional tool ID(s) (retrieved in Step 614) remain to be processed. Accordingly, in one embodiment, if it is determined that at least one tool ID remains to be processed, then the process may proceed to Step 650. On the other hand, in another embodiment, if it is alternatively determined that no more tool IDs remain to be processed, then the process may alternatively end.

In Step 650, upon determining (in Step 648) that at least one additional tool ID (retrieved in Step 614) remains to be processed, the edge-spine network device processes a next tool ID. In one embodiment, processing of the next tool ID may entail the process proceeding to Step 620, where the edge-spine network device may perform another lookup on the tool information table using the next tool ID, to identify a next TRIP and next TC (if specified).

Figure 7A:
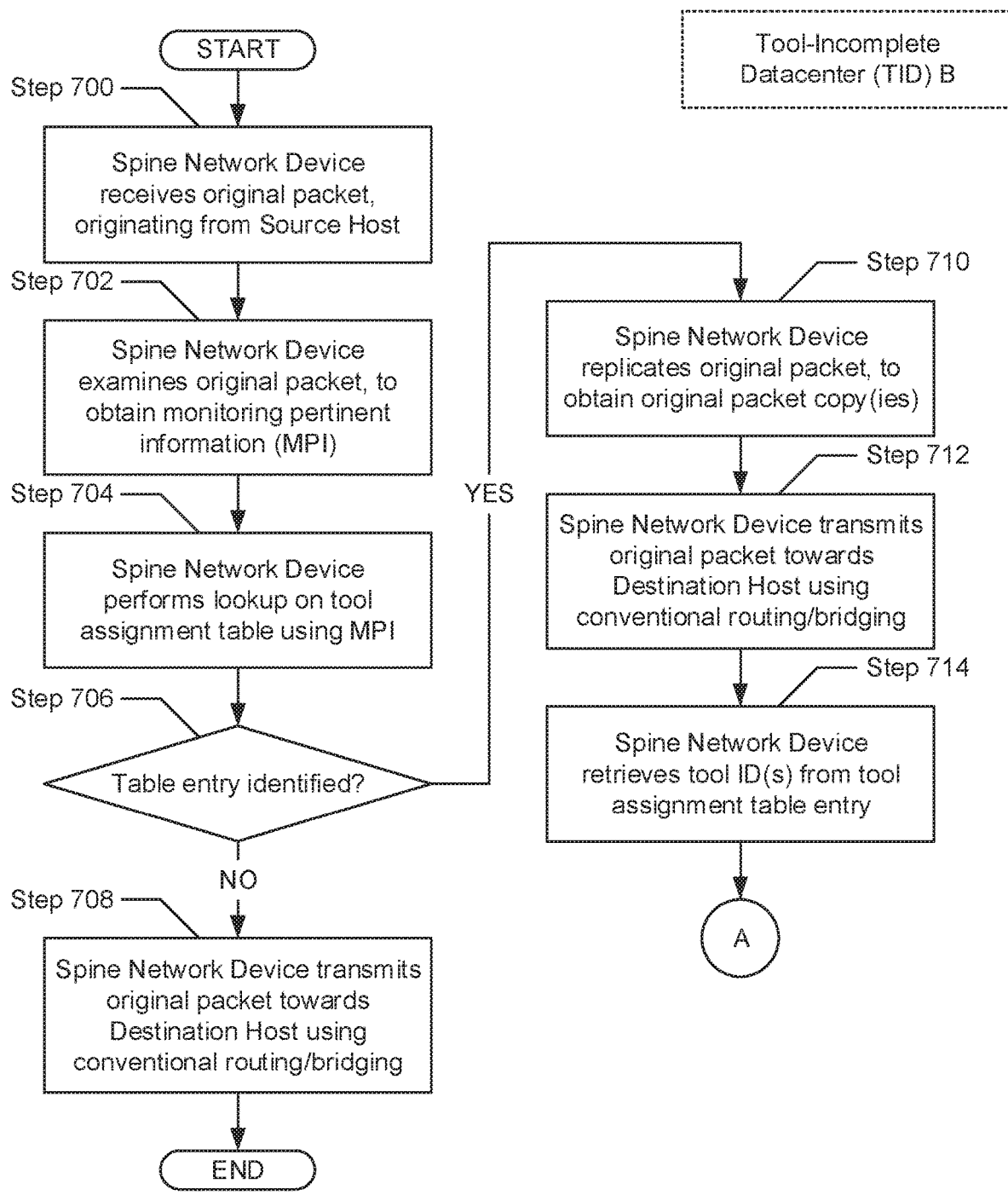
FIGS. 7A-7C show flowcharts describing a method for processing original packets in accordance with one or more embodiments.
Figure 7B:
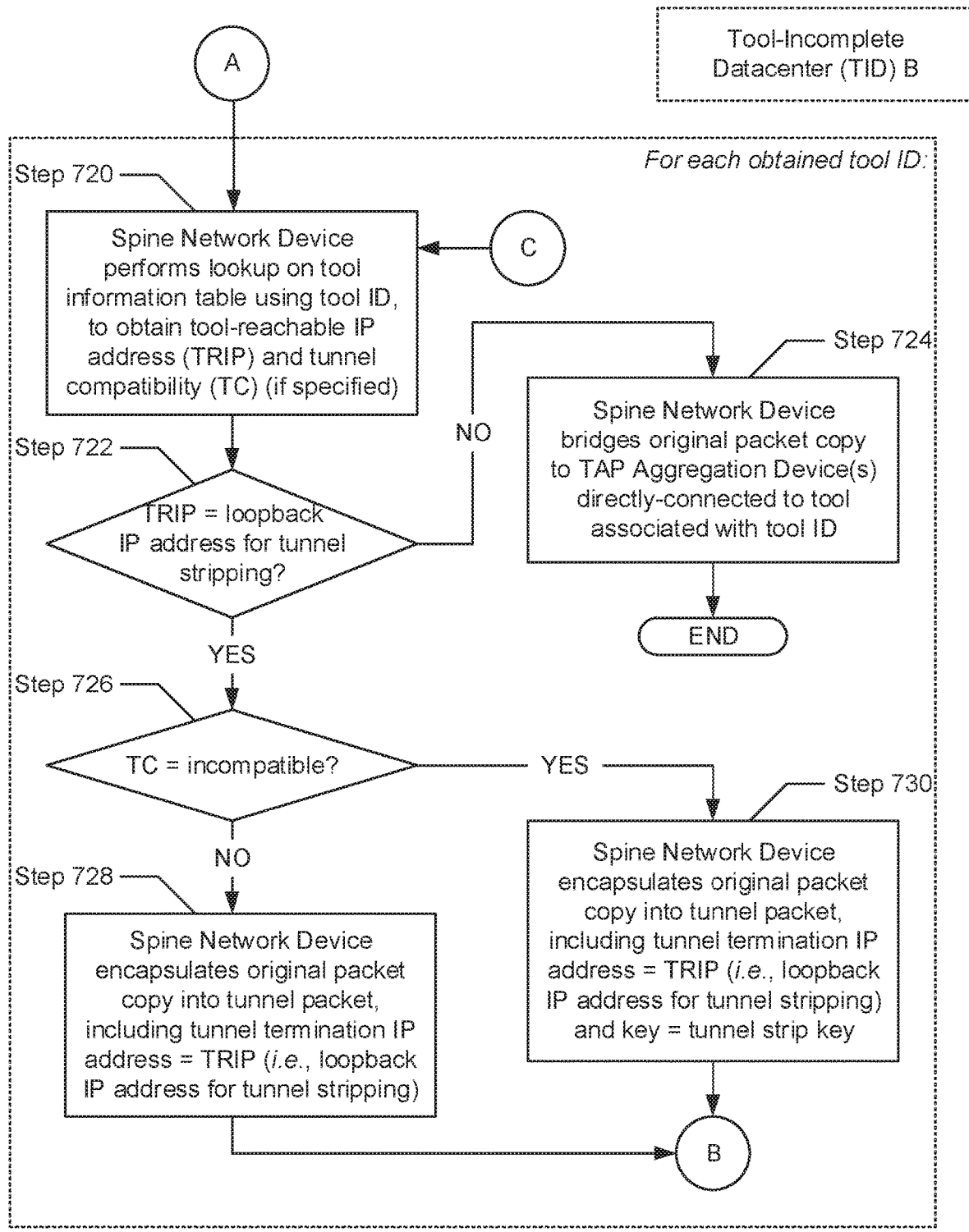
Figure 7C:
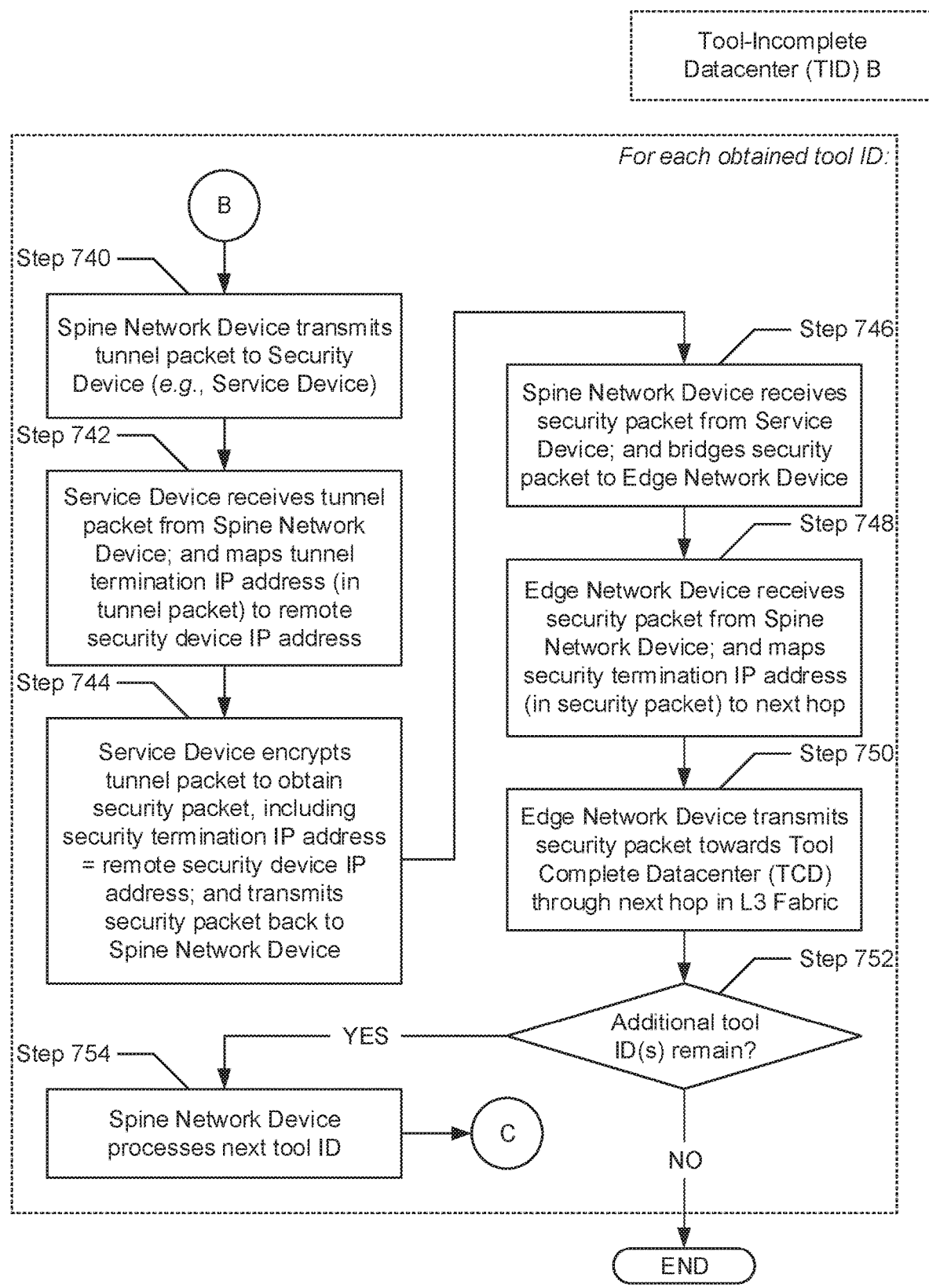

FIGS. 7A-7C show flowcharts describing a method for processing original packets in accordance with one or more embodiments. The various steps outlined below may be performed by various components of a TID (see e.g., FIG. 3B). Further, while the various steps in the flowchart(s) are presented and described sequentially, one of ordinary skill will appreciate that some or all steps may be executed in different orders, may be combined or omitted, and some or all steps may be executed in parallel.

Turning to FIG. 7A, in Step 700, a spine network device (see e.g., FIG. 3B) receives an original packet (see e.g., FIG. 4A). In one embodiment, the received original packet may have originated from (i.e., may have been generated by) a source host, which may be directly-connected to a leaf network device operatively connected to the spine network device.

In Step 702, the spine network device examines the original packet (received in Step 700). In one embodiment, examination of the received original packet may yield monitoring pertinent information (MPI). MPI may refer to one or more attributes (or metadata) that may be descriptive of a given network traffic flow (i.e., a unique sequence of one or more data packets communicated from a source host to a destination host). The attribute(s) may represent criteria for identifying the given network traffic flow—the data packet(s) of which may be sought for deep packet inspection and/or processing. Further, at least a portion of the MPI may be extracted from header information (e.g., L2 header information, L3 header information, and/or L4 header information) embedded in the received original packet and, accordingly, the aforementioned examination may entail at least parsing the received original packet header information.

In Step 704, the spine network device performs a lookup on a tool assignment table (see e.g., FIG. 5A) using the MPI (obtained in Step 702). In one embodiment, the lookup may entail performing a sequential or concurrent (i.e., parallel) entry-by-entry comparison between the MPI and a respective tool assignment mapping key in each table entry of the tool assignment table.

In Step 706, a determination is made as to whether a table entry, of the tool assignment table, is identified as a result of the lookup (performed in Step 704). The determination may rely on whether a table entry includes a tool assignment mapping key that matches at least a portion of the MPI (obtained in Step 702). Accordingly, in one embodiment, if it is determined that at least a portion of the MPI matches the tool assignment mapping key specified in a table entry of the tool assignment table, then a table entry has been identified and the process may proceed to Step 710. On the other hand, in another embodiment, if it is alternatively determined that no portion of the MPI matches the tool assignment mapping key specified in any table entry of the tool assignment table, then no table entry has been identified and the process may alternatively proceed to Step 708.

In Step 708, upon determining (in Step 706) that the tool assignment table lacks at least a table entry that includes a tool assignment mapping key matching at least a portion of the MPI (obtained in Step 704), the spine network device transmits the original packet (received in Step 700) towards a destination host. In one embodiment, the destination host may represent a local or remote host for which the original payload (see e.g., FIG. 4A), in the original packet, may be intended. Further, the transmission may entail conventional network traffic forwarding. That is, in one embodiment, if the destination host is a local host, the transmission of the original packet to the destination host may be facilitated through data-link layer or L2 bridging. In another embodiment, if the destination host is a remote host, the transmission of the original packet to the destination host may alternatively be facilitated through network layer or L3 routing.

In Step 710, upon alternatively determining (in Step 706) that the tool assignment table includes a table entry that includes a tool assignment mapping key matching at least a portion of the MPI (obtained in Step 704), the spine network device replicates the original packet (received in Step 700). In one embodiment, replication of the original packet may yield one or more original packet copies.

In Step 712, the spine network device transmits the original packet (received in Step 700) towards a destination host. In one embodiment, the destination host may represent a local or remote host for which the original payload (see e.g., FIG. 4A), in the original packet, may be intended. Further, the transmission may entail conventional network traffic forwarding. That is, in one embodiment, if the destination host is a local host, the transmission of the original packet to the destination host may be facilitated through data-link layer or L2 bridging. In another embodiment, if the destination host is a remote host, the transmission of the original packet to the destination host may alternatively be facilitated through network layer or L3 routing.

In Step 714, the spine network device retrieves one or more tool identifiers (IDs) from the table entry of the tool assignment table (identified through the determination in Step 706). Specifically, in one embodiment, a tool assignment mapping value, specified in the identified table entry, may be obtained, where the tool assignment mapping value includes the tool ID(s) associated with one or more tools. Further, the tool(s) may represent a physical or virtual computing system (e.g., implemented through software and/or computer hardware) that may be configured to analyze network traffic by way of deep packet inspection (DPI) and packet processing. Hereafter, following the retrieval of one or more tool IDs, the process may proceed to Step 720 (see e.g., FIG. 7B).

Turning to FIG. 7B, hereinafter, Steps 720 through 754 are to be performed for each tool ID (retrieved in Step 714 (see e.g., FIG. 7A)). With the aforementioned in mind, in Step 720, the spine network device performs a lookup on a tool information table (see e.g., FIG. 5B) using the tool ID (i.e., the tool ID currently being processed). In one embodiment, the lookup may entail performing a sequential or concurrent (i.e., parallel) entry-by-entry comparison between the retrieved tool ID and a stored tool ID specified in each table entry of the tool information table. Further, upon matching the retrieved tool ID to the stored tool ID of one of the tool information table entries, a tool-reachable network (e.g., IP) address (TRIP) and a tunnel compatibility (TC) (if specified) is/are obtained.

In one embodiment, the TRIP may refer to a network address, either affiliated with a component residing in the local datacenter or a remote datacenter, where-behind the tool, associated with the retrieved tool ID, may reside. Should the TRIP pertain to a local datacenter network address, the network address may be associated with a TAP aggregation device (see e.g., FIG. 3B), which may be directly-connected to the aforementioned tool. Alternatively, should the TRIP pertain to a remote datacenter (e.g., TCD (see e.g., FIGS. 2A and 2B)) network address, the network address may be associated with a loopback network interface configured on an edge-spine network device, edge network device, and/or spine network device residing in the remote datacenter. The loopback network interface may represent a virtual or logical (i.e., software-defined) network interface, which may be reachable through a physical network interface of the aforementioned edge-spine, edge, and/or spine network device(s). Further, in the latter case, the network address associated with the loopback network interface may also be referred to as the loopback network (e.g., IP) address for tunnel stripping. That is, the network address may pertain to a loopback network interface, which may be configured on a remote datacenter component whereon the decapsulation of received tunnel packets (see e.g., FIG. 4B) may transpire if warranted based on the TC (described below).

In one embodiment, the TC may represent a variable or a value that serves as an indicator for the tunnel packet compatibility of the above-mentioned tool associated with the retrieved tool ID. Tunnel packet compatibility may be expressed in one of two states, which include: (a) a compatible state, indicating that the tool is capable of processing tunnel packets; and (b) an incompatible state, alternatively indicating that the tool is incapable of processing tunnel packets. In the latter case, prior to delivery of the network traffic (e.g., tunnel packet) to the tool, the tunnel packet (see e.g., FIG. 4B) may be decapsulated, to obtain the original packet (see e.g., FIG. 4A) enclosed therein, which may subsequently be provided to the tool for processing. Furthermore, the TC may be implemented using, for example, a binary value (e.g., a logical one or logical zero), a Boolean value (e.g., a true or false), a categorical value (e.g., a "compatible" or "incompatible"), or a numerical value (e.g., a numerical one or numerical zero).

In Step 722, a determination is made as to whether the TRIP (obtained in Step 720) matches a loopback network (e.g., IP) address for tunnel packet stripping (described above). In one embodiment, if it is determined that the TRIP matches the loopback network address for tunnel packet stripping, then the tool (associated with the retrieved tool ID currently being processed) resides on a remote datacenter and the process may proceed to Step 726. On the other hand, in another embodiment, if it is alternatively determined that the TRIP mismatches the loopback network address for tunnel packet stripping, then the tool resides in the local datacenter and the process may alternatively proceed to Step 724.

In Step 724, upon determining (in Step 722) that the TRIP (obtained in Step 720) mismatches the loopback network address for tunnel stripping (described above), the spine network device bridges an original packet copy (obtained in Step 710) to an appropriate TAP aggregation device residing in the local datacenter. In one embodiment, the TAP aggregation device may be assigned to, or associated with, the aforementioned, obtained TRIP. Further, the tool, associated with the retrieved tool ID currently being processed, may reside behind and, thus, may be directly-connected to the appropriate TAP aggregation device. Thereafter, the TAP aggregation device may provide the original packet copy to the directly-connected tool for deeper network traffic inspection and/or processing.

In Step 726, upon alternatively determining (in Step 722) that the TRIP (obtained in Step 720) matches the loopback network address for tunnel stripping (described above), another determination is made as to whether the TC (also obtained in Step 720) reflects an incompatible state. In one embodiment, if it is determined that the TC reflects the incompatible state, then the tool—performing the inspection and processing of the network traffic—is incapable of handling tunnel packets and the process may proceed to Step 730. On the other hand, in another embodiment, if it is alternatively determined that the TC reflects a compatible state, then the tool is capable of handling tunnel packets and the process may alternatively proceed to Step 728.

In Step 728, upon determining (in Step 726) that the TC reflects the compatible state (described above), the spine network device encapsulates an original packet copy (obtained in Step 710) into a tunnel packet (see e.g., FIG. 4B). In one embodiment, encapsulation of the original packet copy, thereby producing the tunnel packet, may entail appending additional header information—e.g., a tunnel header, a tunnel L3 header, and a tunnel L2 header—to the original data packet copy (see e.g., FIG. 4A), which may represent the tunnel payload. Furthermore, the tunnel packet may include a tunnel termination network (e.g., IP) address. The tunnel termination network address may refer to a network address assigned to, or associated with, a termination end point of the network protocol forwarding the tunnel packet through a network. That is, the tunnel packet termination end point may refer to a physical computing system whereon decapsulation (i.e., removal of the additionally appended header information) of the tunnel packet may transpire. Moreover, the tunnel termination network address may be set as the TRIP (i.e., the loopback network address for tunnel stripping) (obtained in Step 720). Hereinafter, following the encapsulation of the original packet copy into the tunnel packet, the process may proceed to Step 740 (see e.g., FIG. 7C).

In Step 730, upon alternatively determining (in Step 726) that the TC reflects the incompatible state (described above), the spine network device encapsulates an original packet copy (obtained in Step 710) into a tunnel packet (see e.g., FIG. 4B). In one embodiment, encapsulation of the original packet copy, thereby producing the tunnel packet, may entail appending additional header information—e.g., a tunnel header, a tunnel L3 header, and a tunnel L2 header—to the original data packet copy (see e.g., FIG. 4A), which may represent the tunnel payload. Furthermore, the tunnel packet may include a tunnel termination network (e.g., IP) address (described above) and a key (see e.g., FIG. 4B). The key (also referred to as the tunnel key) may refer to a data field, of the tunnel header, which may be used to carry over context information, not present in the encapsulated data, that provides context at least with respect to the processing of the tunnel packet. In one embodiment, the enclosed context information may take form as a tunnel strip key representative of the TC (i.e., reflecting the incompatible state) (obtained in Step 720). Hereinafter, following the encapsulation of the original packet copy into the tunnel packet, the process may proceed to Step 740 (see e.g., FIG. 7C).

Turning to FIG. 7C, in Step 740, the spine network device transmits the tunnel packet (obtained in Step 728 or Step 730) to a security device. More specifically, in one embodiment, the security device (also referred to as a service device) may be a virtual private network (VPN) device, which may include functionality to encrypt and decrypt network traffic for secure transmission across a network. Further, transmission of the tunnel packet to the service device may entail network traffic bridging (i.e., data-link layer or L2 forwarding), network traffic routing (i.e., network layer or L3 forwarding), or a combination thereof.

In Step 742, the above-mentioned service (or security) device receives the tunnel packet from the spine network device. Upon receiving the tunnel packet, in one embodiment, the service device may examine the header information (see e.g., FIG. 4B) of the tunnel packet, to identify the tunnel termination network (e.g., IP) address specified therein. Recall, from Step 728 or Step 730, that the tunnel termination network address had been set to the TRIP (i.e., loopback network address for tunnel stripping) (obtained in Step 720). Subsequently, the service device may map the identified tunnel termination network address to a remote service (or security) device network address, where the remote service device network address may be assigned to, or associated with, another VPN device that may reside on a remote datacenter.

In Step 744, the service device encrypts the tunnel packet (received in Step 742) to obtain a security packet (see e.g., FIG. 4C). In one embodiment, encryption of the tunnel packet, thereby producing the security packet, may entail: protecting a security payload, including a substantive portion of the tunnel packet, using IP security (IPsec) encryption and authentication protocols—e.g., the encapsulating security payload (ESP) and authentication header (AH) protocols; and appending additional header and trailer information—e.g., a security header, a security L3 header, a security L2 header, a security trailer, and a security authentication—to the security payload. Furthermore, the security packet may include a security termination network (e.g., IP) address. The security termination network address may refer to a network address assigned to, or associated with, a termination end point of the network protocol forwarding the security packet through a network. That is, the security packet termination end point may refer to a physical computing system whereon decryption of the security packet may transpire. Moreover, the security termination network address may be set as the remote security device network address (identified in Step 742).

In Step 746, the spine network device receives the security packet from the service device. Upon receiving the security packet, in one embodiment, the spine network device may examine the header information (see e.g., FIG. 4C) of the security packet, to identify the security termination network (e.g., IP) address specified therein. Recall, from Step 744, that the security termination network address has been set to the remote service (or security) device network address (identified in Step 742). Subsequently, based on at least the security termination network address, the spine network device transmits (i.e., bridges) the security packet to the edge network device of the local datacenter.

In Step 748, the edge network device receives the security packet from the spine network device. Upon receiving the security packet, in one embodiment, the edge network device may examine the header information (see e.g., FIG. 4C) of the security packet, to identify the security termination network (e.g., IP) address specified therein. Recall, from Step 744, that the security termination network address has been set to the remote service (or security) device network address (identified in Step 742). Subsequently, based on at least the security termination network address, the edge network device may map the identified security termination network address to a next hop network (e.g., IP) address associated with a next hop. The next hop may represent a physical computing system just outside the local datacenter and, thereby, residing in the L3 fabric. Further, the next hop may refer to a physical computing system residing along a network path towards reaching the security termination network address.

In Step 750, the edge network device transmits (i.e., routes) the security packet towards the remote datacenter (e.g., a TCD) through the next hop (identified in Step 748). In one embodiment, the tool, associated with the tool ID currently being processed, may reside in the remote datacenter.

In Step 752, a determination is made as to whether any additional tool ID(s) (retrieved in Step 714) remain to be processed. Accordingly, in one embodiment, if it is determined that at least one tool ID remains to be processed, then the process may proceed to Step 754. On the other hand, in another embodiment, if it is alternatively determined that no more tool IDs remain to be processed, then the process may alternatively end.

In Step 754, upon determining (in Step 752) that at least one additional tool ID (retrieved in Step 714) remains to be processed, the spine network device processes a next tool ID. In one embodiment, processing of the next tool ID may entail the process proceeding to Step 720, where the spine network device may perform another lookup on the tool information table using the next tool ID, to identify a next TRIP and next TC (if specified).

Figure 8:
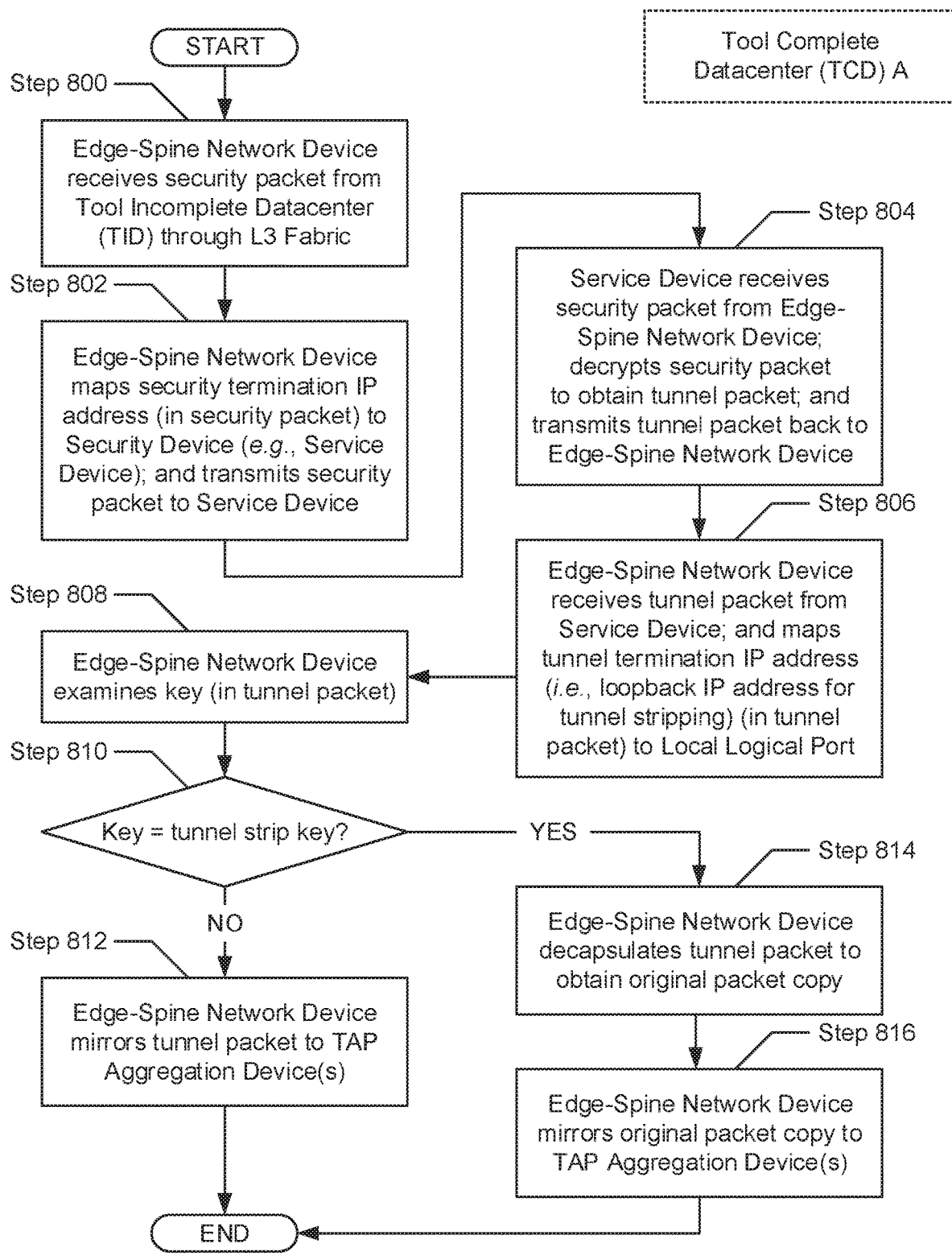
FIG. 8 shows a flowchart describing a method for processing security packets in accordance with one or more embodiments.

FIG. 8 shows a flowchart describing a method for processing security packets in accordance with one or more embodiments. The various steps outlined below may be performed by various components of a TCD (see e.g., FIG. 2A). Further, while the various steps in the flowchart(s) are presented and described sequentially, one of ordinary skill will appreciate that some or all steps may be executed in different orders, may be combined or omitted, and some or all steps may be executed in parallel.

Turning to FIG. 8, in Step 800, an edge-spine network device receives a security packet (see e.g., FIG. 4C). In one embodiment, the received security packet may have originated from (i.e., may have been generated in) a TID (see e.g., FIGS. 3A and 3B). Further, the security packet may include, but is not limited to, a security termination network (e.g., IP) address. The security termination network address may be assigned to, or associated with, a termination end point of the network protocol forwarding the security packet through a network. That is, the security packet termination end point may refer to a physical computing system whereon decryption of the security packet may transpire.

In Step 802, the edge-spine network device maps the above-mentioned security termination network address, included in the security packet (received in Step 800), to a locally-residing security device. More specifically, in one embodiment, the security device (also referred to as a service device) may be a virtual private network (VPN) device, which may include functionality to encrypt and decrypt network traffic for secure transmission across a network. Further, based on mapping the security termination network address to a locally-residing service (or security) device, the edge-spine network device transmits the received security packet to the service device. Transmission of the security packet to the service device may entail network traffic bridging (i.e., data-link layer or L2 forwarding), network traffic routing (i.e., network layer or L3 forwarding), or a combination thereof.

In Step 804, the above-mentioned service (or security) device receives the security packet from the edge-spine network device. Upon receiving the security packet, in one embodiment, the service device may decrypt the security packet to obtain the tunnel packet (see e.g., FIG. 4B) enclosed therein. Decryption of the security packet, thereby exposing the tunnel packet, may entail: removing the additional header and trailer information—e.g., the security header, the security L3 header, the security L2 header, the security trailer, and the security authentication—appended to the tunnel packet at the security origination end point; and reversing the application of the IP security (IPsec) encryption and authentication protocols—e.g., the encapsulating security payload (ESP) and authentication header (AH) protocols—which had been protecting a security payload of the security packet, where the security payload includes a substantive portion of the tunnel packet. Thereafter, the service device transmits the obtained tunnel packet back to the edge-spine network device. Transmission of the tunnel packet to the edge-spine device may entail network traffic bridging (i.e., data-link layer or L2 forwarding), network traffic routing (i.e., network layer or L3 forwarding), or a combination thereof.

In Step 806, the edge-spine network device receives the tunnel packet (obtained in Step 804) from the service device. Upon receiving the tunnel packet, in one embodiment, the edge-spine network device may examine the header information of the tunnel packet (see e.g., FIG. 4B) to identify the tunnel termination network (e.g., IP) address disclosed therein. The tunnel termination network address may have been set to a tool-reachable network (e.g., IP) address (TRIP), which may encompass a loopback network address (for tunnel stripping). Subsequently, the edge-spine network device may map the identified tunnel termination network address (i.e., the loopback network address for tunnel stripping) to a local loopback network interface. The loopback network interface may represent a virtual or logical (i.e., software-defined) network interface, which may be reachable through a physical network interface of edge-spine network device. The loopback network interface, at least from the perspective of the edge-spine network device, may also be referred to as a local logical network interface (or port).

In Step 808, the edge-spine network device further examines the header information of the tunnel packet to identify a key (also referred to as a tunnel key) (if any) disclosed therein. In one embodiment, the key may refer to a data field, of the tunnel header, which may be used to carry over context information, not present in the encapsulated data, that provides context at least with respect to the processing of the tunnel packet. Within the tunnel packet header information, (a) a key may not be present, indicating no context information had been carried over; (b) a key taking form as a tunnel strip key may be present, where the tunnel strip key carries over context information representative of the tunnel compatibility (TC) associated with the tool assigned to process the network traffic; or (c) a key taking form as another designated key (e.g., a non-tunnel strip key) may be present, where the other designated key carries over some other context information outside the scope of this disclosure. Further, should the key disclose a tunnel strip key, then the TC may reflect an incompatible state, thereby indicating that the aforementioned tool, assigned to process the network traffic, is incapable of handling tunnel packets.

In Step 810, a determination is made as to whether the key (sought to be examined in Step 808) is (a) present in the header information of the tunnel packet (received in Step 806), and (b) matches the tunnel strip key (described above). In one embodiment, if it is determined that both of these conditions prove to be true, then the process may proceed to Step 814. On the other hand, in another embodiment, if it is alternatively determined that at least one of the aforementioned conditions proves to be false, then the process may alternatively proceed to Step 812.

In Step 812, upon determining (in Step 810) that a key is not present in the header information of the tunnel packet (received in Step 806), the edge-spine network device forwards (i.e., mirrors or bridges) the tunnel packet to an appropriate TAP aggregation device (see e.g., FIG. 2A) residing in the local datacenter (i.e., TCD). In one embodiment, the lack of a key in the tunnel packet header information may indicate that the TC associated with the tool, assigned to process the network traffic, reflects a compatible state—i.e., the tool is capable of handling tunnel packets. Accordingly, the edge-spine network device does nothing with regards to pre-processing the tunnel packet prior to forwarding the tunnel packet to the aforementioned, appropriate TAP aggregation device. Further, the appropriate TAP aggregation device may refer to the TAP aggregation device where-behind the tool, assigned to process the network traffic, resides. Thereafter, the TAP aggregation device may provide the tunnel packet to the directly-connected tool for deeper network traffic inspection and/or processing.

In Step 814, upon alternatively determining (in Step 810) that the above-described tunnel strip key is present in the header information of the tunnel packet (received in Step 806), the edge-spine network device decapsulates the tunnel packet to obtain the original packet copy enclosed therein. In one embodiment, as mentioned above, the presence of a key matching the tunnel strip key, in the tunnel packet header information, may indicate that the TC associated with the tool, assigned to process the network traffic, reflects an incompatible state—i.e., the tool is incapable of handling tunnel packets. Accordingly, based on this indication, the edge-spine network device pre-processes (i.e., decapsulates) the tunnel packet. Further, decapsulation of the tunnel packet, thereby exposing the original packet copy therein, may entail removing the additional header information— e.g., the tunnel header, the tunnel L3 header, and the tunnel L2 header—which had been appended to the original packet copy at the tunnel origination end point.

In Step 816, the edge-spine network device forwards (i.e., mirrors or bridges) the original packet copy (obtained in Step 814) to a TAP aggregation device (see e.g., FIG. 2A) residing in the local datacenter (i.e., TCD). In one embodiment, the appropriate TAP aggregation device may refer to the TAP aggregation device where-behind the tool, assigned to process the network traffic, resides. Thereafter, the TAP aggregation device may provide the tunnel packet to the directly-connected tool for deeper network traffic inspection and/or processing.

Figure 9A:
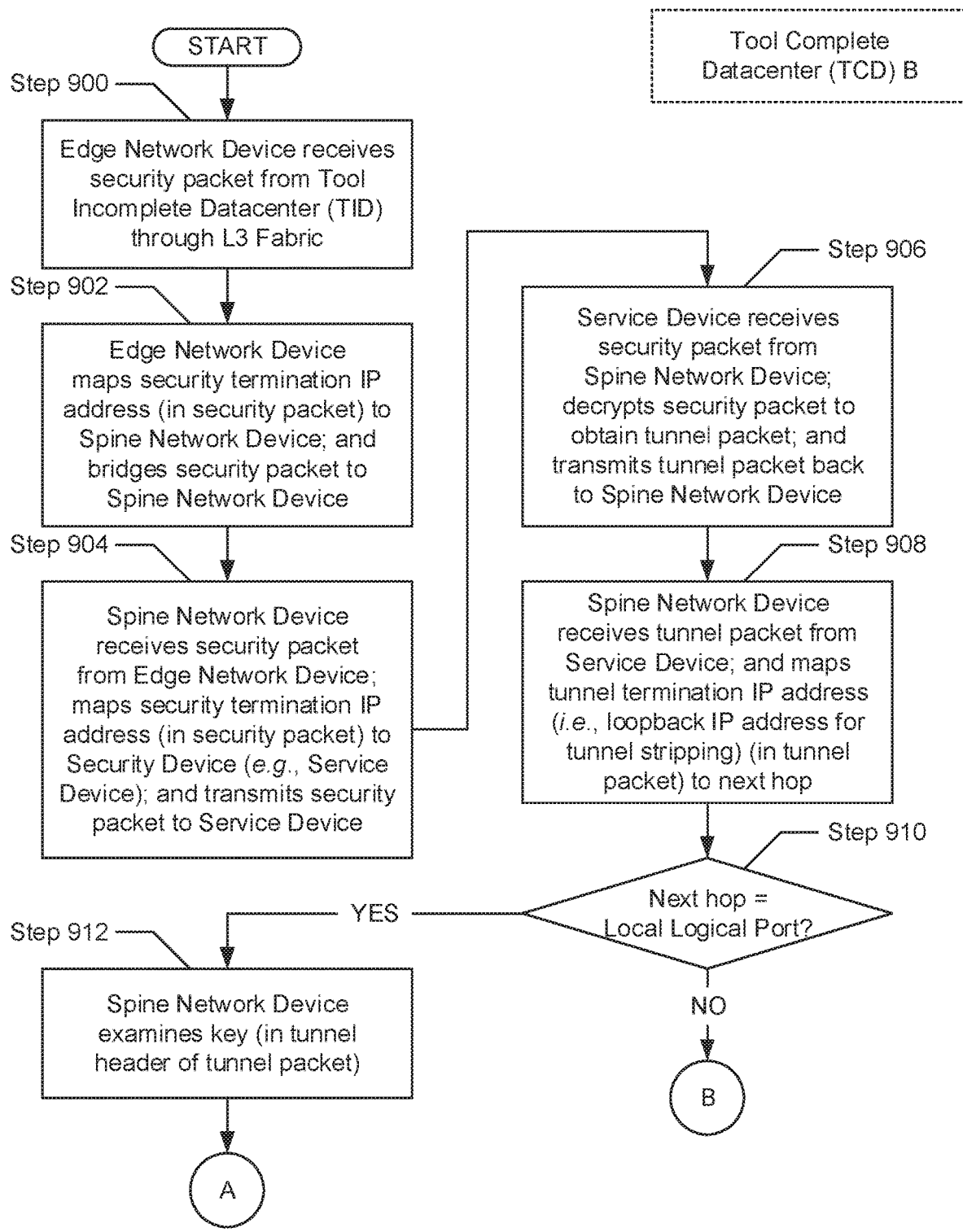
FIGS. 9A-9C show flowcharts describing a method for processing security packets in accordance with one or more embodiments.
Figure 9B:
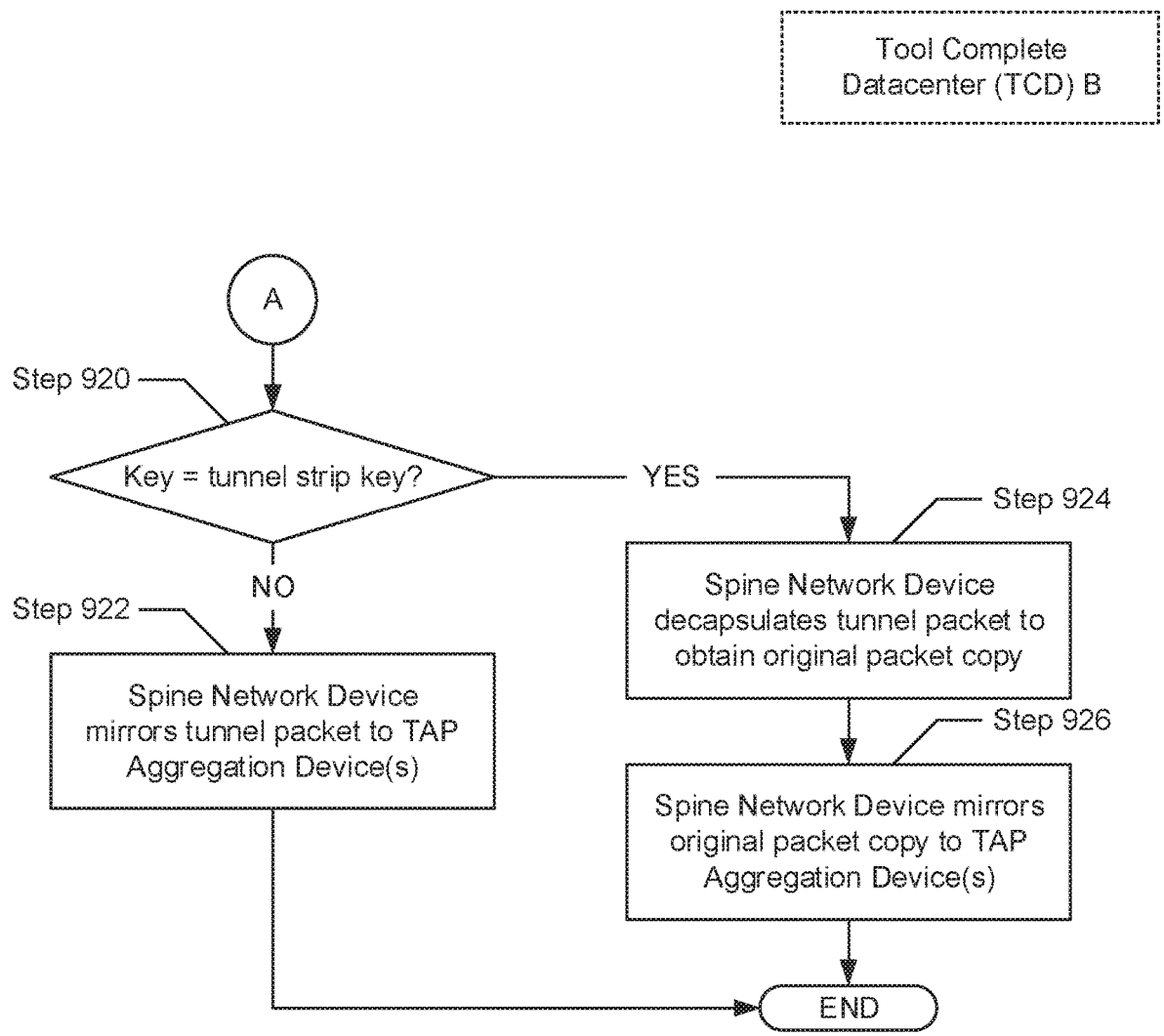
Figure 9C:
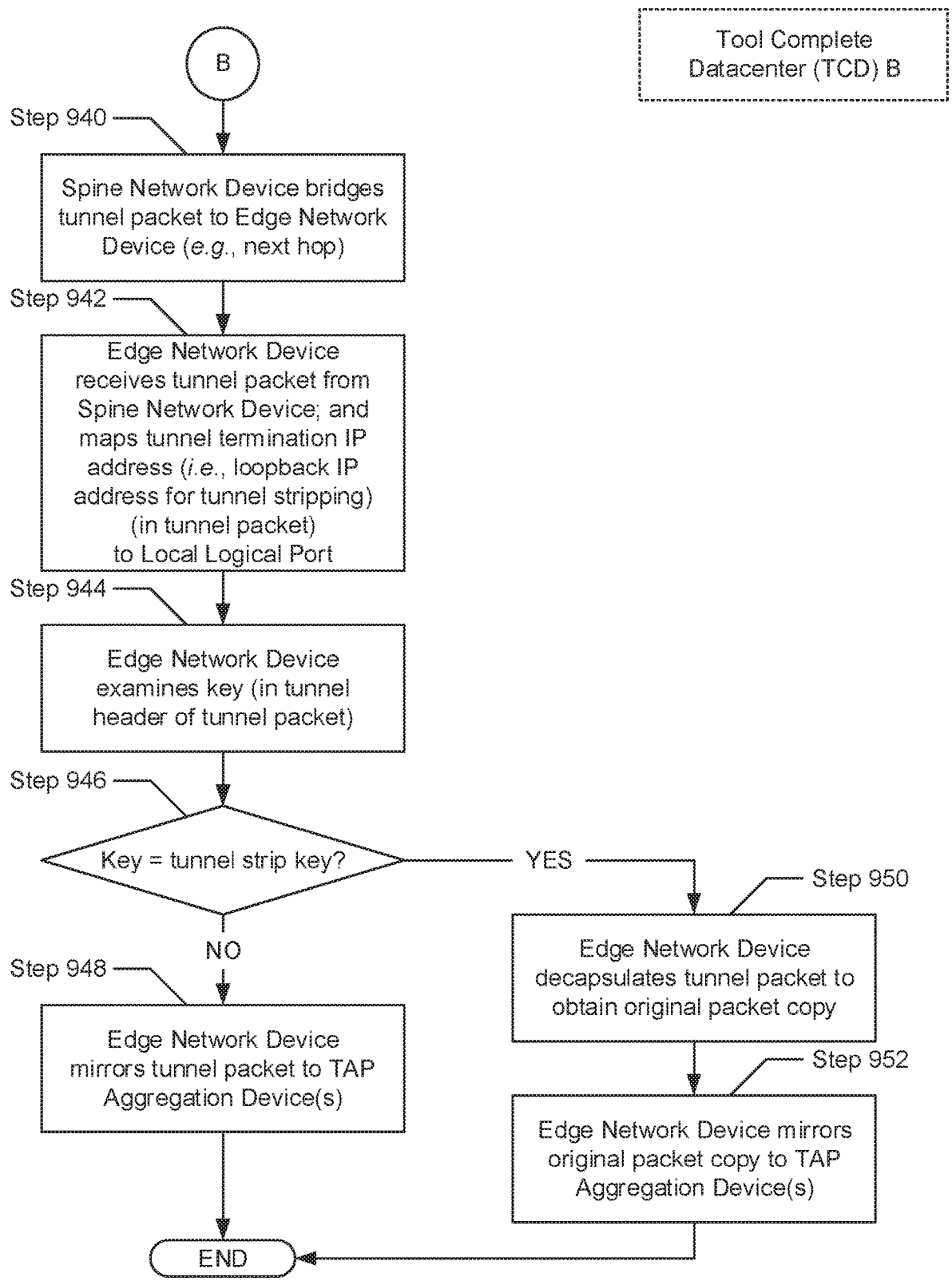

FIGS. 9A-9C show flowcharts describing a method for processing security packets in accordance with one or more embodiments. The various steps outlined below may be performed by various components of a TCD (see e.g., FIG. 2B). Further, while the various steps in the flowchart(s) are presented and described sequentially, one of ordinary skill will appreciate that some or all steps may be executed in different orders, may be combined or omitted, and some or all steps may be executed in parallel.

Turning to FIG. 9A, in Step 900, an edge network device receives a security packet (see e.g., FIG. 4C). In one embodiment, the received security packet may have originated from (i.e., may have been generated in) a TID (see e.g., FIGS. 3A and 3B). Further, the security packet may include, but is not limited to, a security termination network (e.g., IP) address. The security termination network address may be assigned to, or associated with, a termination end point of the network protocol forwarding the security packet through a network. That is, the security packet termination end point may refer to a physical computing system whereon decryption of the security packet may transpire.

In Step 902, the edge network device maps the above-mentioned security termination network address, included in the security packet (received in Step 900), to a spine network device of the local datacenter (i.e., TCD (see e.g., FIG. 2B)). Based on this mapping, in one embodiment, the edge network device subsequently forwards (i.e., bridges) the security packet to the spine network device.

In Step 904, the spine network device receives the security packet from the edge network device. Upon receiving the security packet, the spine network device maps the above-mentioned security termination network address, included in the security packet (received in Step 900), to a locally-residing security device. More specifically, in one embodiment, the security device (also referred to as a service device) may be a virtual private network (VPN) device, which may include functionality to encrypt and decrypt network traffic for secure transmission across a network. Further, based on mapping the security termination network address to a locally-residing service (or security) device, the spine network device transmits the received security packet to the service device. Transmission of the security packet to the service device may entail network traffic bridging (i.e., data-link layer or L2 forwarding), network traffic routing (i.e., network layer or L3 forwarding), or a combination thereof.

In Step 906, the above-mentioned service (or security) device receives the security packet from the spine network device. Upon receiving the security packet, in one embodiment, the service device may decrypt the security packet to obtain the tunnel packet (see e.g., FIG. 4B) enclosed therein. Decryption of the security packet, thereby exposing the tunnel packet, may entail: removing the additional header and trailer information—e.g., the security header, the security L3 header, the security L2 header, the security trailer, and the security authentication—appended to the tunnel packet at the security origination end point; and reversing the application of the IP security (IPsec) encryption and authentication protocols—e.g., the encapsulating security payload (ESP) and authentication header (AH) protocols— which had been protecting a security payload of the security packet, where the security payload includes a substantive portion of the tunnel packet. Thereafter, the service device transmits the obtained tunnel packet back to the spine network device. Transmission of the tunnel packet to the spine device may entail network traffic bridging (i.e., data-link layer or L2 forwarding), network traffic routing (i.e., network layer or L3 forwarding), or a combination thereof.

In Step 908, the spine network device receives the tunnel packet (obtained in Step 906) from the service device. Upon receiving the tunnel packet, in one embodiment, the spine network device may examine the header information of the tunnel packet (see e.g., FIG. 4B) to identify the tunnel termination network (e.g., IP) address disclosed therein. The tunnel termination network address may have been set to a tool-reachable network (e.g., IP) address (TRIP), which may encompass a loopback network address (for tunnel stripping). Subsequently, the spine network device may map the identified tunnel termination network address (i.e., the loopback address for tunnel stripping) to a next hop. Further, the next hop may be directed to a local loopback network interface. The local loopback network interface may represent a virtual or logical (i.e., software-defined) network interface, which may be reachable through a physical network interface of spine network device. The local loopback network interface, at least from the perspective of the spine network device, may also be referred to as a local logical network interface (or port). Alternatively, the next hop may be directed to the remote loopback network interface. The remote loopback network interface may represent a virtual or logical (i.e., software-defined) network interface, which may be reachable through a physical network interface of edge network device. The remote loopback network interface, at least from the perspective of the spine network device, may also be referred to as a remote logical network interface (or port).

In Step 910, a determination is made as to whether the next hop (identified in Step 908) is directed to a local logical network interface (or port) (described above). In one embodiment, if it is determined that the next hop refers to the local logical port, residing behind a physical network interface on the spine network device, then the process may proceed to Step 912. On the other hand, if it is alternatively determined that the next hop refers to a remote logical network interface (or port), residing behind a physical network interface on the edge network device, then the process may alternatively proceed to Step 940 (see e.g., FIG. 9C).

In Step 912, upon determining (in Step 910) that the next hop (identified in Step 908) is directed to a local logical port of the spine network device, the spine network device further examines the header information of the tunnel packet to identify a key (also referred to as a tunnel key) (if any) disclosed therein. In one embodiment, the key may refer to a data field, of the tunnel header, which may be used to carry over context information, not present in the encapsulated data, that provides context at least with respect to the processing of the tunnel packet. Within the tunnel packet header information, (a) a key may not be present, indicating no context information had been carried over; (b) a key taking form as a tunnel strip key may be present, where the tunnel strip key carries over context information representative of the tunnel compatibility (TC) associated with the tool assigned to process the network traffic; or (c) a key taking form as another designated key (e.g., a non-tunnel strip key) may be present, where the other designated key carries over some other context information outside the scope of this disclosure. Further, should the key disclose a tunnel strip key, then the TC may reflect an incompatible state, thereby indicating that the aforementioned tool, assigned to process the network traffic, is incapable of handling tunnel packets. Hereinafter, following the examination of the key, the process may proceed to Step 920 (see e.g., FIG. 9B).

Turning to FIG. 9B, in Step 920, a determination is made as to whether the key (sought to be examined in Step 912) is (a) present in the header information of the tunnel packet (received in Step 908), and (b) matches the tunnel strip key (described above). In one embodiment, if it is determined that both of these conditions prove to be true, then the process may proceed to Step 924. On the other hand, in another embodiment, if it is alternatively determined that at least one of the aforementioned conditions proves to be false, then the process may alternatively proceed to Step 922.

In Step 922, upon determining (in Step 920) that a key is not present in the header information of the tunnel packet (received in Step 908), the spine network device forwards (i.e., mirrors or bridges) the tunnel packet to an appropriate TAP aggregation device (see e.g., FIG. 2B) residing in the local datacenter (i.e., TCD). In one embodiment, the lack of a key in the tunnel packet header information may indicate that the TC associated with the tool, assigned to process the network traffic, reflects a compatible state—i.e., the tool is capable of handling tunnel packets. Accordingly, the spine network device does nothing with regards to pre-processing the tunnel packet prior to forwarding the tunnel packet to the aforementioned, appropriate TAP aggregation device. Further, the appropriate TAP aggregation device may refer to the TAP aggregation device where-behind the tool, assigned to process the network traffic, resides. Thereafter, the TAP aggregation device may provide the tunnel packet to the directly-connected tool for deeper network traffic inspection and/or processing.

In Step 924, upon alternatively determining (in Step 920) that the above-described tunnel strip key is present in the header information of the tunnel packet (received in Step 908), the spine network device decapsulates the tunnel packet to obtain the original packet copy enclosed therein. In one embodiment, as mentioned above, the presence of a key matching the tunnel strip key, in the tunnel packet header information, may indicate that the TC associated with the tool, assigned to process the network traffic, reflects an incompatible state—i.e., the tool is incapable of handling tunnel packets. Accordingly, based on this indication, the spine network device pre-processes (i.e., decapsulates) the tunnel packet. Further, decapsulation of the tunnel packet, thereby exposing the original packet copy therein, may entail removing the additional header information—e.g., the tunnel header, the tunnel L3 header, and the tunnel L2 header—which had been appended to the original packet copy at the tunnel origination end point.

In Step 926, the spine network device forwards (i.e., mirrors or bridges) the original packet copy (obtained in Step 924) to a TAP aggregation device (see e.g., FIG. 2B) residing in the local datacenter (i.e., TCD). In one embodiment, the appropriate TAP aggregation device may refer to the TAP aggregation device where-behind the tool, assigned to process the network traffic, resides. Thereafter, the TAP aggregation device may provide the tunnel packet to the directly-connected tool for deeper network traffic inspection and/or processing.

Turning to FIG. 9C, in Step 940, upon alternatively determining (in Step 910) that the next hop (identified in Step 908) is directed to a remote logical port of the edge network device, the spine network device forwards (i.e., bridges) the tunnel packet to the edge network device.

In Step 942, the edge network device receives the tunnel packet from the spine network device. In one embodiment, upon receiving the tunnel packet, in one embodiment, the edge network device may examine the header information of the tunnel packet (see e.g., FIG. 4B) to identify the tunnel termination network (e.g., IP) address disclosed therein. The tunnel termination network address may have been set to a tool-reachable network (e.g., IP) address (TRIP), which may encompass a loopback network address (for tunnel stripping). Subsequently, the edge network device may map the identified tunnel termination network address (i.e., the loopback network address for tunnel stripping) to a local loopback network interface. The local loopback network interface may represent a virtual or logical (i.e., software-defined) network interface, which may be reachable through a physical network interface of edge network device. The local loopback network interface, at least from the perspective of the edge network device, may also be referred to as a local logical network interface (or port).

In Step 944, the edge network device further examines the header information of the tunnel packet to identify a key (also referred to as a tunnel key) (if any) disclosed therein. In one embodiment, the key may refer to a data field, of the tunnel header, which may be used to carry over context information, not present in the encapsulated data, that provides context at least with respect to the processing of the tunnel packet. Within the tunnel packet header information, (a) a key may not be present, indicating no context information had been carried over; (b) a key taking form as a tunnel strip key may be present, where the tunnel strip key carries over context information representative of the tunnel compatibility (TC) associated with the tool assigned to process the network traffic; or (c) a key taking form as another designated key (e.g., a non-tunnel strip key) may be present, where the other designated key carries over some other context information outside the scope of this disclosure. Further, should the key disclose a tunnel strip key, then the TC may reflect an incompatible state, thereby indicating that the aforementioned tool, assigned to process the network traffic, is incapable of handling tunnel packets.

In Step 946, a determination is made as to whether the key (sought to be examined in Step 944) is (a) present in the header information of the tunnel packet (received in Step 942), and (b) matches the tunnel strip key (described above). In one embodiment, if it is determined that both of these conditions prove to be true, then the process may proceed to Step 950. On the other hand, in another embodiment, if it is alternatively determined that at least one of the aforementioned conditions proves to be false, then the process may alternatively proceed to Step 948.

In Step 948, upon determining (in Step 946) that a key is not present in the header information of the tunnel packet (received in Step 944), the edge network device forwards (i.e., mirrors or bridges) the tunnel packet to an appropriate TAP aggregation device (see e.g., FIG. 2B) residing in the local datacenter (i.e., TCD). In one embodiment, the lack of a key in the tunnel packet header information may indicate that the TC associated with the tool, assigned to process the network traffic, reflects a compatible state—i.e., the tool is capable of handling tunnel packets. Accordingly, the edge network device does nothing with regards to pre-processing the tunnel packet prior to forwarding the tunnel packet to the aforementioned, appropriate TAP aggregation device. Further, the appropriate TAP aggregation device may refer to the TAP aggregation device where-behind the tool, assigned to process the network traffic, resides. Thereafter, the TAP aggregation device may provide the tunnel packet to the directly-connected tool for deeper network traffic inspection and/or processing.

In Step 950, upon alternatively determining (in Step 946) that the above-described tunnel strip key is present in the header information of the tunnel packet (received in Step 944), the edge network device decapsulates the tunnel packet to obtain the original packet copy enclosed therein. In one embodiment, as mentioned above, the presence of a key matching the tunnel strip key, in the tunnel packet header information, may indicate that the TC associated with the tool, assigned to process the network traffic, reflects an incompatible state—i.e., the tool is incapable of handling tunnel packets. Accordingly, based on this indication, the edge network device pre-processes (i.e., decapsulates) the tunnel packet. Further, decapsulation of the tunnel packet, thereby exposing the original packet copy therein, may entail removing the additional header information—e.g., the tunnel header, the tunnel L3 header, and the tunnel L2 header—which had been appended to the original packet copy at the tunnel origination end point.

In Step 952, the edge network device forwards (i.e., mirrors or bridges) the original packet copy (obtained in Step 950) to a TAP aggregation device (see e.g., FIG. 2B) residing in the local datacenter (i.e., TCD). In one embodiment, the appropriate TAP aggregation device may refer to the TAP aggregation device where-behind the tool, assigned to process the network traffic, resides. Thereafter, the TAP aggregation device may provide the tunnel packet to the directly-connected tool for deeper network traffic inspection and/or processing.

Figure 10:
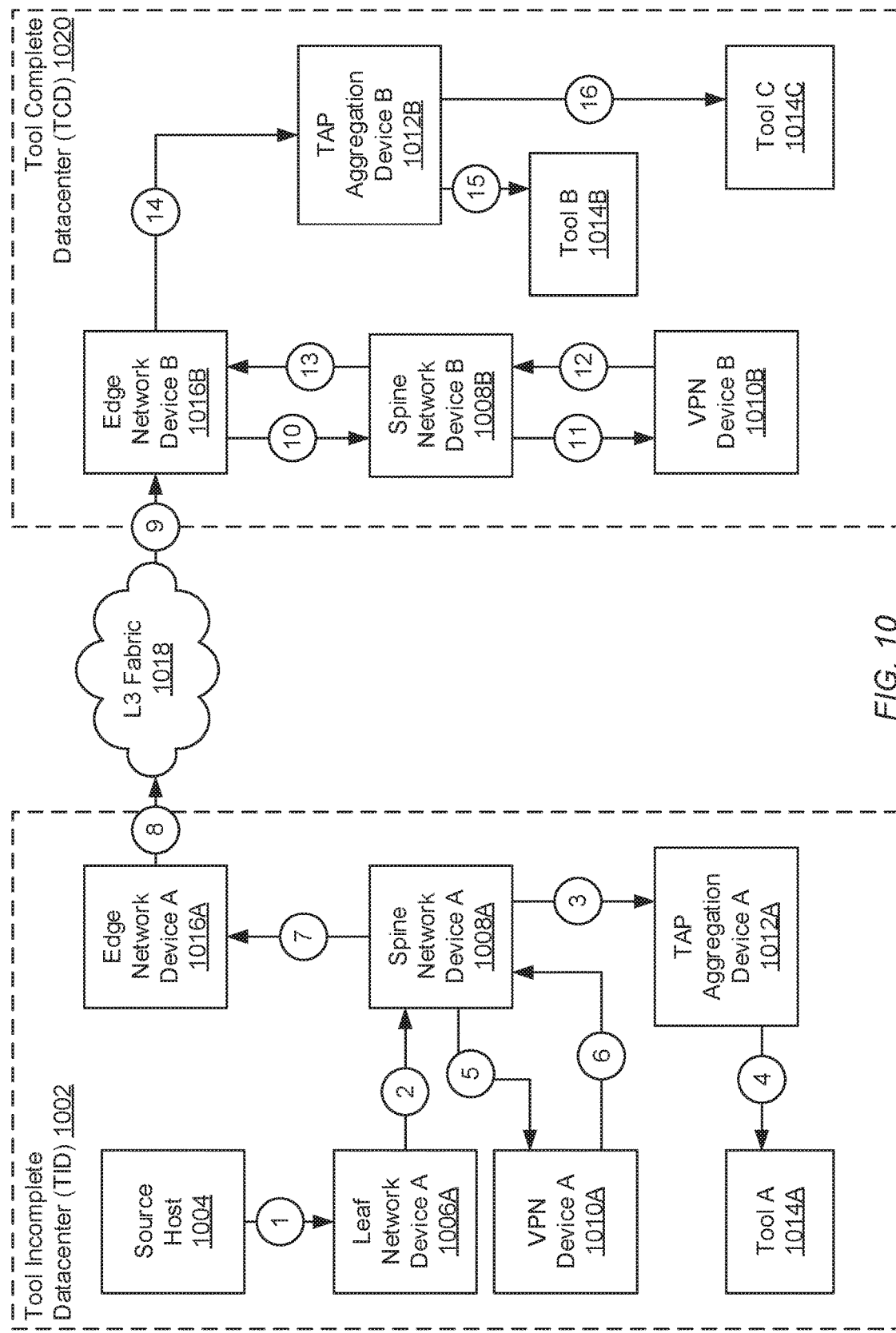
FIG. 10 shows an example scenario in accordance with one or more embodiments.

FIG. 10 shows an example scenario in accordance with one or more embodiments. The following example scenario, presented in conjunction with components shown in FIG. 10, is for explanatory purposes only and not intended to limit the scope of the technology.

Turning to FIG. 10, for context regarding the example scenario, consider an example system (1000), which includes a TID (1002) (substantially similar to the TID shown in FIG. 3B) and a TCD (1020) (substantially similar to the TCD shown in FIG. 2B) that are operatively connected to one another through a L3 fabric (1018).

The TID (1002) includes a source host (1004), which directly-connects to a first leaf network device (1006A). The first leaf network device (1006A) operatively connects to a first spine network device (1008A), which, in turn, operatively connects to a first virtual private network (VPN) device (1010A) (e.g., a first service device), a first terminal access point (TAP) aggregation device (1012A), and a first edge network device (1016A). Further, other than the first spine network device (1008A), the first edge network device (1016A) operatively connects to the L3 fabric (1018). Moreover, a first tool (1014A) directly-connects to the first TAP aggregation device (1012A).

On the other hand, the TCD (1020) includes a second edge network device (1016B) that operatively connects to the L3 fabric (1018), a second spine network device (1008B), and a second TAP aggregation device (1012B). The second spine network device (1008B), in turn, operatively connects to a second VPN device (1010B) (e.g., a second service device). Furthermore, the second TAP aggregation device (1012B) directly-connects to a second tool (1014B) and a third tool (1014C).

Another aspect of note, with respect to context for the example scenario to-be-outlined below, the loopback network interface (i.e., the virtual or logical network interface), directed to tunnel packet stripping (described above), resides behind a physical network interface (not shown) of the second edge network device (1016B) in the TCD (1020).

Turning to the example scenario, consider the following enumerated sequence of events—each of which map to a matching enumerated circle illustrated in FIG. 10.

1) At the TID (1002), the source host (1004) generates and forwards (i.e., bridges) an original packet (see e.g., FIG. 4A) to the first leaf network device (1006A).
2) At the TID (1002), upon receiving the original packet from the source host (1004), the first leaf network device (1006A) forwards (i.e., bridges) the original packet to the first spine network device (1008A).
3) At the TID (1002), upon receiving the original packet from the first leaf network device (1006A), the first spine network device (1008A):
   a. Examines the original packet to identify monitoring pertinent information (MPI);
   b. Performs a lookup on a tool assignment table (see e.g., FIG. 5A) using the MPI to identify three tool identifiers (IDs)—i.e., a first tool ID associated with the first tool (1014A), a second tool ID associated with the second tool (1014B), and a third tool ID associated with the third tool (1014C);
   c. Replicates the original packet to obtain three original packet copies—i.e., a first original packet copy, a second original packet copy, and a third original packet copy;
   d. Transmits the original packet towards a local or remote destination host (not shown) using conventional bridging and/or routing;

e. Performs a first lookup on a tool information table (see e.g., FIG. 5B) using the first tool ID to obtain a first tool-reachable IP address (TRIP);
f. Performs a second lookup on the tool information table using the second tool ID to obtain a second TRIP and a first tunnel compatibility (TC);
g. Performs a third lookup on the tool information table using the third tool ID to obtain a third TRIP and a second TC; and
h. Forwards the first original packet copy to the first TAP aggregation device (1012A) based on the first TRIP not matching the loopback IP address for tunnel stripping (i.e., rather, the first TRIP identifies as the IP address associated with the first TAP aggregation device (1012A)).

4) At the TID (1002), upon receiving the first original packet copy from the first spine network device (1008A), the first TAP aggregation device (1012A) forwards (i.e., bridges) the first original packet copy to the first tool (1014A) for deep network traffic inspection and/or processing.

5) At the TID (1002), the first spine network device (1008A):
a. Encapsulates the second original packet copy into a first tunnel packet (see e.g., FIG. 4B) based on the second TRIP matching the loopback IP address for tunnel stripping, where the first tunnel packet includes a tunnel termination IP address set as the loopback IP address for tunnel stripping based on the first TC reflecting a compatible state;
b. Encapsulates the third original packet copy into a second tunnel packet based on the third TRIP matching the loopback IP address for tunnel stripping, where the second tunnel packet includes a (tunnel) key set as a tunnel strip key and a tunnel termination IP address set as the loopback IP address for tunnel stripping based on the second TC reflecting an incompatible state; and
c. Forwards (i.e., bridges and/or routes) the first and second tunnel packets to the first VPN device (1010A).

6) At the TID (1002), upon receiving the first and second tunnel packets from the first spine network device (1008A), the first VPN device (1010A):
a. Maps the tunnel termination IP address, for both the first and second tunnel packets, to a remote VPN device IP address associated with the second VPN device (1010B);
b. Encrypts the first tunnel packet to obtain a first security packet (see e.g., FIG. 4C), where the first security packet includes a security termination IP address set as the remote VPN device IP address;
c. Encrypts the second tunnel packet to obtain a second security packet, where the second security packet includes a security termination IP address set as the remote VPN device IP address; and
d. Forwards (i.e., bridges and/or routes) the first and second security packets to the first spine network device (1008A).

7) At the TID (1002), upon receiving the first and second security packets from the first VPN device (1010A), the first spine network device (1008A) forwards (i.e., bridges) the first and second security packets to the first edge network device (1016A).

8) At the TID (1002), upon receiving the first and second security packets from the first spine network device (1008A), the first edge network device (1016A) transmits the first and second security packets, across the L3 fabric (1018), to the TCD (1020).

9) At the TCD (1020), the second edge network device (1016B) receives the first and second security packets (see e.g., FIG. 4C) from the TID (1002) through the L3 fabric (1018).

10) At the TCD (1020), the second edge network device (1016B):
a. Examines the first security packet to identify a security termination IP address, which is found to be the VPN device IP address associated with the second VPN device (1010B);
b. Examines the second security packet to identify a security termination IP address, which is also found to be the VPN device IP address associated with the second VPN device (1010B); and
c. Forwards (i.e., bridges) the first and second security packets to the second spine network device (1008B).

11) At the TCD (1020), upon receiving the first and second security packets from the second edge network device (1016B), the second spine network device (1008B) forwards (i.e., bridges and/or routes) the first and second security packets to the second VPN device (1010B).

12) At the TCD (1020), upon receiving the first and second security packets from the second spine network device (1008B), the second VPN device (1010B):
a. Decrypts the first security packet to obtain the first tunnel packet (see e.g., FIG. 4B);
b. Decrypts the second security packet to obtain the second tunnel packet; and
c. Forwards (i.e., bridges and/or routes) the first and second tunnel packets to the second spine network device (1008B).

13) At the TCD (1020), upon receiving the first and second tunnel packets from the second VPN device (1010B), the second spine network device (1008B):
a. Examines the first tunnel packet to identify a tunnel termination IP address, which is found to match the loopback IP address (for tunnel stripping) associated with a loopback network interface configured on the second edge network device (1016B);
b. Examines the second tunnel packet to identify a tunnel termination IP address, which is also found to match the loopback IP address (for tunnel stripping) associated with the loopback network interface configured on the second edge network device (1016B); and
c. Forwards (i.e., bridges), based on the examinations, the first and second tunnel packets to the second edge network device (1016B).

14) At the TCD (1020), upon receiving the first and second tunnel packets from the second spine network device (1008B), the second edge network device (1016B):
a. Examines the first tunnel packet to identify a lack of a (tunnel) key therein;
b. Forwards (i.e., bridges), based on the lack of a (tunnel) key in the first tunnel packet, the first tunnel packet to the second TAP aggregation device (1012B);
c. Examines the second tunnel packet to identify a (tunnel) key therein, where the (tunnel) key is found to be a tunnel strip key;

d. Decapsulates, based on the presence of the tunnel strip key in the second tunnel packet, the second tunnel packet to obtain the third original packet copy (see e.g., FIG. 4A); and
e. Forwards the third original packet copy to the second TAP aggregation device (1012B).

15) At the TCD (1020), upon receiving the first tunnel packet from the second edge network device (1016B), the second TAP aggregation device (1012B) forwards (i.e., bridges) the first tunnel packet to the second tool (1014B) for deep network traffic inspection and/or processing.

16) At the TCD (1020), upon receiving the third original packet copy from the second edge network device (1016B), the second TAP aggregation device (1012B) forwards (i.e., bridges) the third original packet copy to the third tool (1014C) for deep network traffic inspection and/or processing.

While the technology has been described with respect to a limited number of embodiments, those skilled in the art, having the benefit of this disclosure, will appreciate that other embodiments can be devised which do not depart from the scope of the technology as disclosed herein. Accordingly, the scope of the technology should be limited only by the attached claims.

What is claimed is:

1. A method for processing network traffic, comprising:
receiving a first original packet originating from a source host;
examining the first original packet to obtain first monitoring pertinent information;
obtaining, based on the first monitoring pertinent information, a first tool-reachable network address and a tunnel compatibility, wherein the first tool-reachable network address identifies a local service device in a datacenter comprising one or more tools capable of analyzing the first original packet, and the tunnel compatibility identifies whether the one or more tools are capable of processing tunnel packets;
encapsulating, based on the first tool-reachable network address and the tunnel compatibility, the first original packet into a tunnel packet, wherein a header of the tunnel packet comprises the tunnel compatibility; and
transmitting the tunnel packet to the local service device.

2. The method of claim 1, wherein the first original packet comprises header information, and wherein the first monitoring pertinent information comprises at least a portion of the header information.

3. The method of claim 1, wherein obtaining the first tool-reachable network address and the tunnel compatibility, comprises:
performing a first lookup on a tool assignment table using the first monitoring pertinent information to identify a tool identifier; and
performing a second lookup on a tool information table using the tool identifier to obtain the first tool-reachable network address and the tunnel compatibility.

4. The method of claim 1, wherein the first tool-reachable network address is a loopback Internet Protocol (IP) address associated with a logical network interface configured through a physical network interface of a remote network device.

5. The method of claim 4, wherein the tunnel compatibility reflects a compatible state, wherein the tunnel packet further comprises a tunnel termination network address comprising the loopback IP address.

6. The method of claim 4, wherein the tunnel compatibility reflects an incompatible state, wherein the tunnel packet further comprises a tunnel strip key and a tunnel termination network address comprising the loopback IP address.

7. The method of claim 1, wherein the tunnel packet is a generic routing encapsulation (GRE) packet.

8. The method of claim 1, further comprising:
receiving, from the local service device, a security packet comprising a security termination network address and the tunnel packet; and
transmitting, based on the security termination network address, the security packet to a tool-complete datacenter.

9. The method of claim 8, wherein the security termination network address comprises a remote service device Internet Protocol (IP) address associated with a remote service device residing in the tool-complete datacenter.

10. The method of claim 8, wherein the security packet is a virtual private network (VPN) packet.

11. The method of claim 1, further comprising:
receiving a second original packet originating from the source host;
examining the second original packet to obtain second monitoring pertinent information;
obtaining, based on the second monitoring pertinent information, a second tool-reachable network address; and
transmitting, based on the second tool-reachable network address, the second original packet to a local terminal access point (TAP) aggregation device.

12. A method for processing network traffic, comprising:
receiving, by a network device associated with a tool-complete datacenter comprising one or more tools capable of processing a security packet and from a tool-incomplete datacenter without the one or more tools, the security packet comprising a security termination network address and a tunnel packet;
transmitting, by the network device and based on the security termination network address, the security packet to a service device;
receiving, by the network device and from the service device, the tunnel packet comprising a tunnel termination network address and an original packet; and
mirroring, by the network device and based at least on the tunnel termination network address, either the tunnel packet or the original packet to a traffic analyzing tool wherein mirroring either the tunnel packet or the original packet to the traffic analyzing tool comprises:
making a first determination, by the network device, that the tunnel packet includes a tunnel compatibility, wherein the tunnel compatibility is included in a header of the tunnel packet and comprises information indicating whether the traffic analyzing tool is in a compatible state that is able to decapsulate tunnel packets or in an incompatible state that is unable to decapsulate tunnel packets; and
mirroring either the tunnel packet or the original packet to the traffic analyzing tool based on the first determination.

13. The method of claim 12, wherein the security termination network address comprises a service device Internet Protocol (IP) address associated with the service device.

14. The method of claim 12, wherein the security packet is a virtual private network (VPN) packet, wherein the tunnel packet is a generic routing encapsulation (GRE) packet.

15. The method of claim 12, wherein the tunnel termination network address comprises a loopback Internet Protocol (IP) address associated with a local logical network interface configured through a local physical network interface.

16. The method of claim 15, wherein, in response to determining that the tunnel compatibility is directed to the compatible state, mirroring either the tunnel packet or the original packet to the traffic analyzing tool further comprises:
   examining the tunnel packet to identify a lack of a key therein; and
   mirroring, based on the lack of the key, the tunnel packet to the traffic analyzing tool.

17. The method of claim 15, wherein in response to determining that the tunnel compatibility is directed to the incompatible state, mirroring either the tunnel packet or the original packet to the traffic analyzing tool, further comprises:
   examining the tunnel packet to identify a presence of a key therein;
   making a determination that the key matches a tunnel strip key;
   decapsulating, based on the determination, the tunnel packet to obtain the original packet; and
   mirroring the original packet to the traffic analyzing tool.

18. A network device, comprising:
   a plurality of ports comprising a port through which a security packet is received, wherein the security packet comprises a security termination network address and a tunnel packet, wherein the network device is associated with a tool-complete datacenter comprising one or more tools capable of processing the security packet, and wherein the security packet is transmitted from a tool-incomplete datacenter without the one or more tools;
   a memory comprising computer readable instructions; and
   a computer processor operatively connected to the plurality of ports and the memory, and when executing the computer readable instructions, is configured to:
   transmit, based on the security termination network address, the security packet to a service device;
   receive, from the service device, the tunnel packet comprising a tunnel termination network address and an original packet; and
   mirror, based at least on the tunnel termination network address, either the tunnel packet or the original packet to a traffic analyzing tool
   wherein mirroring either the tunnel packet or the original packet to the traffic analyzing tool comprises:
      making a first determination that the tunnel packet includes a tunnel compatibility, wherein the tunnel compatibility is included in a header of the tunnel packet and comprises information indicating whether the traffic analyzing tool is in a compatible state that is able to decapsulate tunnel packets or in an incompatible state that is unable to decapsulate tunnel packets; and
      mirroring either the tunnel packet or the original packet to the traffic analyzing tool based on the first determination.

* * * * *